US012657574B2

(12) United States Patent
Fadell et al.

(10) Patent No.: US 12,657,574 B2
(45) Date of Patent: Jun. 16, 2026

(54) SLOTTED ANTENNA COMPRISING AN ELECTRODE RADIOFREQUENCY SIGNAL INJECTOR AND DEVICE COMPRISING SUCH AN ANTENNA

(71) Applicant: LEDGER, Paris (FR)

(72) Inventors: Anthony Michael Fadell, Paris (FR); Andrew David Lauder, Oxford (GB); David John Tupman, Huntington Beach, CA (US); Dean Darnell, Chapel Hill, NC (US)

(73) Assignee: LEDGER, Paris (FR)

( * ) Notice: Subject to any disclaimer, the term of this patent is extended or adjusted under 35 U.S.C. 154(b) by 0 days.

(21) Appl. No.: 19/112,184

(22) PCT Filed: Sep. 11, 2023

(86) PCT No.: PCT/FR2023/051383
§ 371 (c)(1),
(2) Date: Mar. 14, 2025

(87) PCT Pub. No.: WO2024/056970
PCT Pub. Date: Mar. 21, 2024

(65) Prior Publication Data
US 2026/0094148 A1 Apr. 2, 2026

(30) Foreign Application Priority Data

Sep. 16, 2022 (FR) ...................................... 2209380
Sep. 16, 2022 (FR) ...................................... 2209381
(Continued)

(51) Int. Cl.
G06Q 20/36 (2012.01)
H01Q 1/24 (2006.01)
(Continued)

(52) U.S. Cl.
CPC ........... *G06Q 20/367* (2013.01); *H01Q 1/243* (2013.01); *H01Q 13/103* (2013.01); *H04L 9/0894* (2013.01); *H04L 9/50* (2022.05)

(58) Field of Classification Search
CPC ........ G06Q 20/00–425; H04L 9/00–50; H01Q 1/00–528
See application file for complete search history.

(56) References Cited

U.S. PATENT DOCUMENTS 8,381,994 B2 2/2013 Hsieh
9,785,187 B2 10/2017 Kim et al.
(Continued)

FOREIGN PATENT DOCUMENTS

CN 103310262 A 9/2013
CN 109214816 A 1/2019

OTHER PUBLICATIONS

International Search Report and Written Opinion of the International Searching Authority dated Jan. 29, 2024, in connection with International Application No. PCT/FR2023/051383, 23 pages.
(Continued)

*Primary Examiner* — Chenyuh Kuo

(57) ABSTRACT

An electronic device comprising a chassis receiving a closed-slot antenna comprising a longitudinal port made in and through a side wall of the chassis. The antenna comprises a radio frequency signal injector comprising two substantially parallel flat electrodes, the first electrode resting on a first surface of the longitudinal port and the second electrode resting on a second surface of the longitudinal port. A compression element made of a flexible and elastic material, arranged between the two electrodes, exerts a spreading force on them which presses them against the first and second surfaces of the longitudinal port.

15 Claims, 17 Drawing Sheets

(30) Foreign Application Priority Data

| | | | |
|---|---|---|---|
| Sep. 16, 2022 | (FR) | ................................... | 2209382 |
| Sep. 16, 2022 | (FR) | ................................... | 2209384 |
| Sep. 16, 2022 | (FR) | ................................... | 2209385 |

(51) Int. Cl.

| | |
|---|---|
| *H01Q 13/10* | (2006.01) |
| *H04L 9/00* | (2022.01) |
| *H04L 9/08* | (2006.01) |

(56) References Cited

U.S. PATENT DOCUMENTS

| | | | | |
|---|---|---|---|---|
| 11,379,840 | B2 | 7/2022 | Gandhi | |
| 11,397,956 | B1 | 7/2022 | Eidam et al. | |
| 2009/0153407 | A1* | 6/2009 | Zhang | H01Q 1/243 |
| | | | | 343/702 |
| 2015/0249485 | A1* | 9/2015 | Ouyang | H04B 5/48 |
| | | | | 455/552.1 |
| 2019/0190115 | A1 | 6/2019 | Samardzija et al. | |
| 2019/0307002 | A1 | 10/2019 | Tessier et al. | |
| 2020/0265418 | A1 | 8/2020 | Lee et al. | |
| 2021/0367321 | A1* | 11/2021 | Hung | H01Q 5/385 |
| 2023/0146114 | A1* | 5/2023 | Wu | H01Q 9/42 |
| | | | | 343/702 |
| 2024/0079784 | A1* | 3/2024 | Wang | H01Q 1/48 |

OTHER PUBLICATIONS

International Search Report and Written Opinion of the International Searching Authority dated Dec. 7, 2023, in connection with International Application No. PCT/FR2023/051377, 17 pages.

International Search Report and Written Opinion of the International Searching Authority dated Apr. 3, 2024, in connection with International Application No. PCT/FR2023/051378, 28 pages.

International Search Report and Written Opinion of the International Searching Authority dated Apr. 3, 2024, in connection with International Application No. PCT/FR2023/051379, 26 pages.

International Search Report and Written Opinion of the International Searching Authority dated Jan. 29, 2024, in connection with International Application No. PCT/FR2023/051380, 25 pages.

International Search Report and Written Opinion of the International Searching Authority dated Feb. 8, 2024, in connection with International Application No. PCT/FR2023/051381, 16 pages.

Dai, et al., "SBLWT: A Secure Blockchain Lightweight Wallet Based on Trustzone," IEEE Access, Jul. 2018, 11 pages.

Urien, "Innovative Countermeasures to Defeat Cyber Attacks Against Blockchain Wallets," 2011 5th Cyber Security in Networking Conference (CSNet), IEEE, Oct. 2021, 6 pages.

Varvello, et al., "BatteryLab, A Distributed Power Monitoring Platform for Mobile Devices," arXiv:1910.08951v1 [cs.DC], Oct. 2009, 8 pages.

English Translation of International Preliminary Report on Patentability Chapter II dated Mar. 16, 2025, in connection with International Application No. PCT/FR2023/051377, 13 pages.

English Translation of International Preliminary Report on Patentability Chapter II dated Mar. 16, 2025, in connection with International Application No. PCT/FR2023/051378, 32 pages.

English Translation of International Preliminary Report on Patentability Chapter II dated Mar. 16, 2025, in connection with International Application No. PCT/FR2023/051379, 21 pages.

International Preliminary Report on Patentability Chapter I dated Mar. 27, 2025 and English Translation of the Written Opinion of the International Search Authority dated Mar. 16, 2025, in connection with International Application No. PCT/FR2023/051380, 16 pages.

International Preliminary Report on Patentability Chapter I dated Mar. 27, 2025 and English Translation of the Written Opinion of the International Search Authority dated Mar. 16, 2025, in connection with International Application No. PCT/FR2023/051381, 9 pages.

International Preliminary Report on Patentability Chapter I dated Mar. 27, 2025 and English Translation of the Written Opinion of the International Search Authority dated Mar. 16, 2025, in connection with International Application No. PCT/FR2023/051383, 15 pages.

* cited by examiner

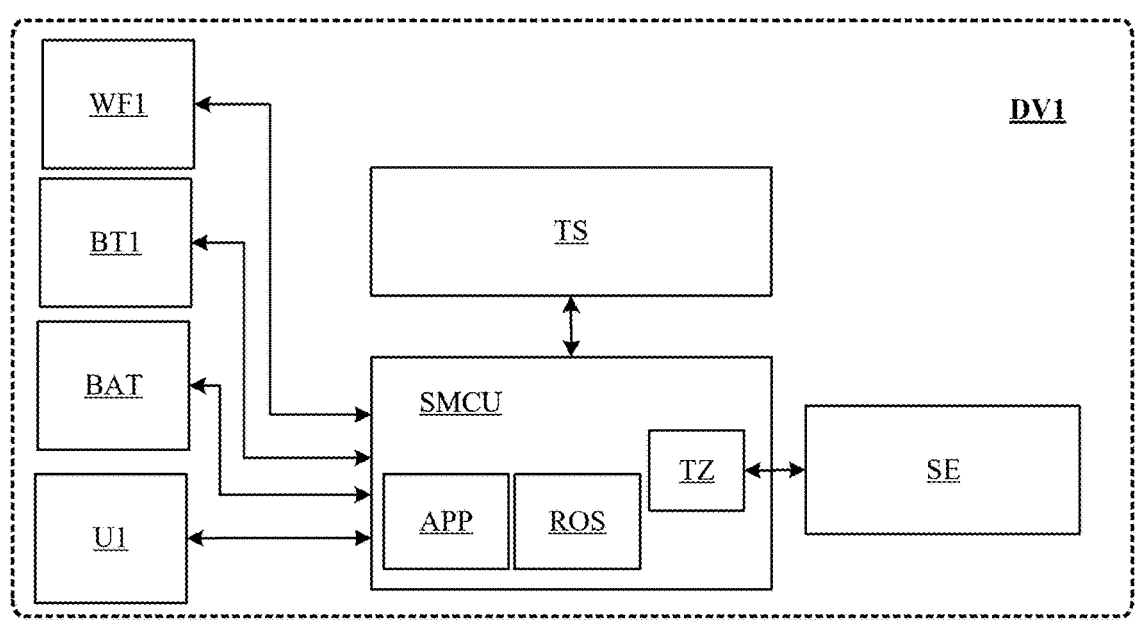
Fig. 4 ((Prior Art)
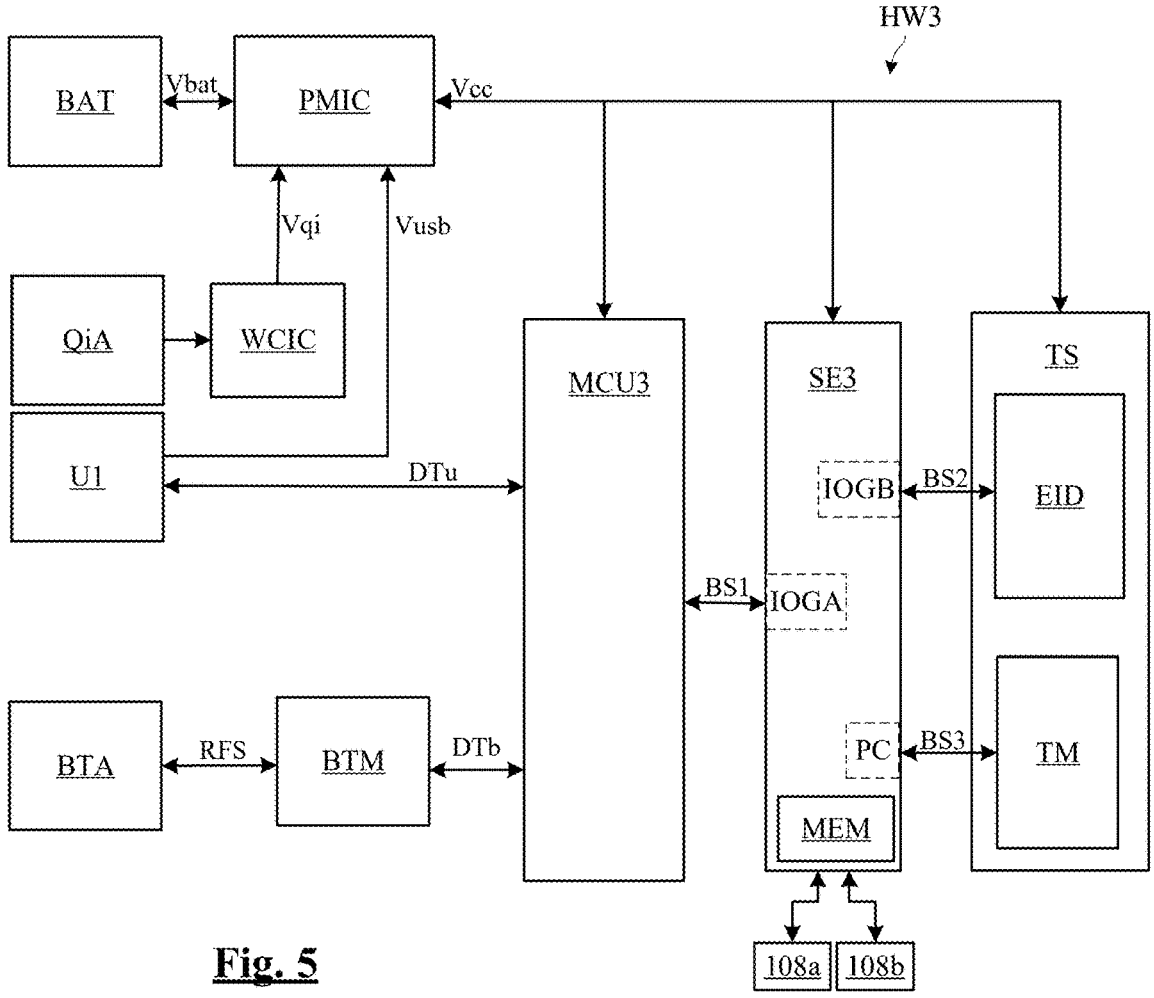
Fig. 5

HW3

(S01) SE3 sends a WM selection command to MCU3

(S02) MCU3 provides SEL2 signal on IOM4

(S03) MCU3 confirms selection to SE3

(S04) ESE3 establishes communication with WM and executes operation (S05) SSE3 sends a WM deselection command to MCU3

(S06) Deselection of WM by MCU3

(S07) MCU3 confirms deselection

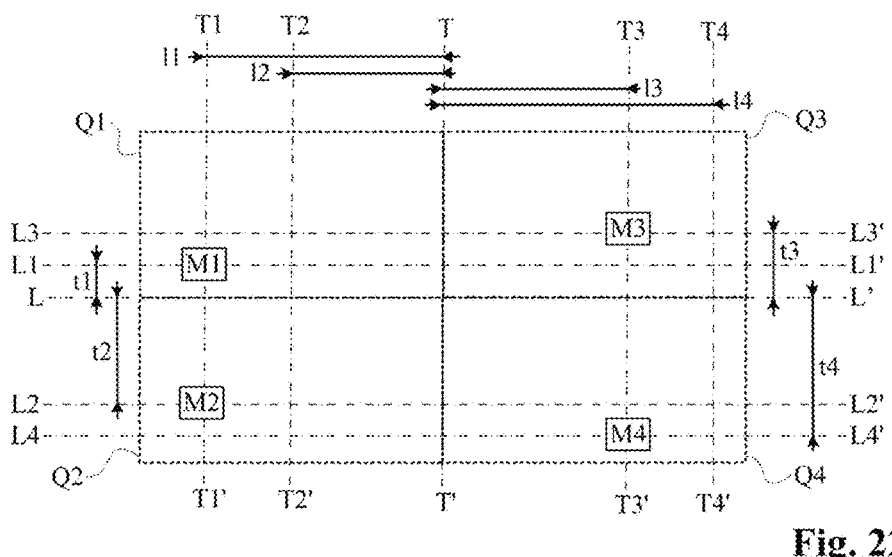
Fig. 22
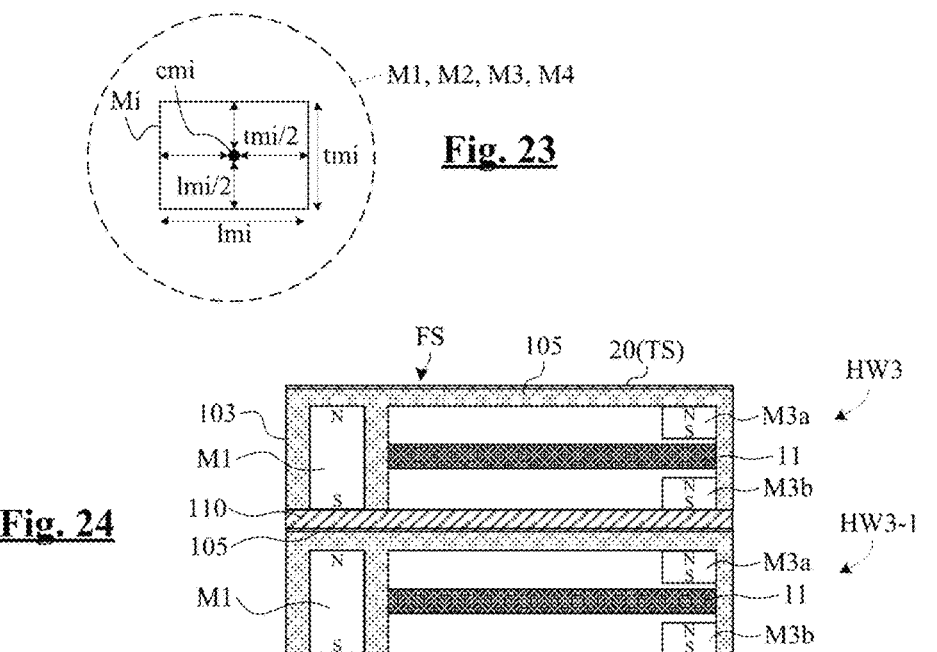
Fig. 23
Fig. 24
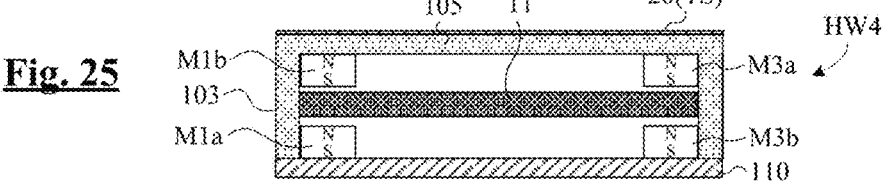
Fig. 25
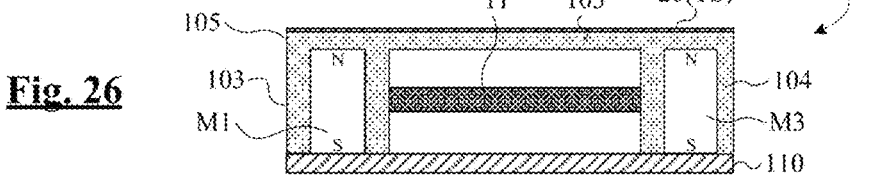
Fig. 26

(S10) (Top mode) Communicate with devices present in the stack to identify and store them (S11) Request user to select desired device (Fig. 26)

(S12) Establish communication with user-designated device (S13) Receive display information from device and show on touchscreen (S14) Detect user action on touchscreen (S15) Transmit action to selected device (S16) User selection of another device

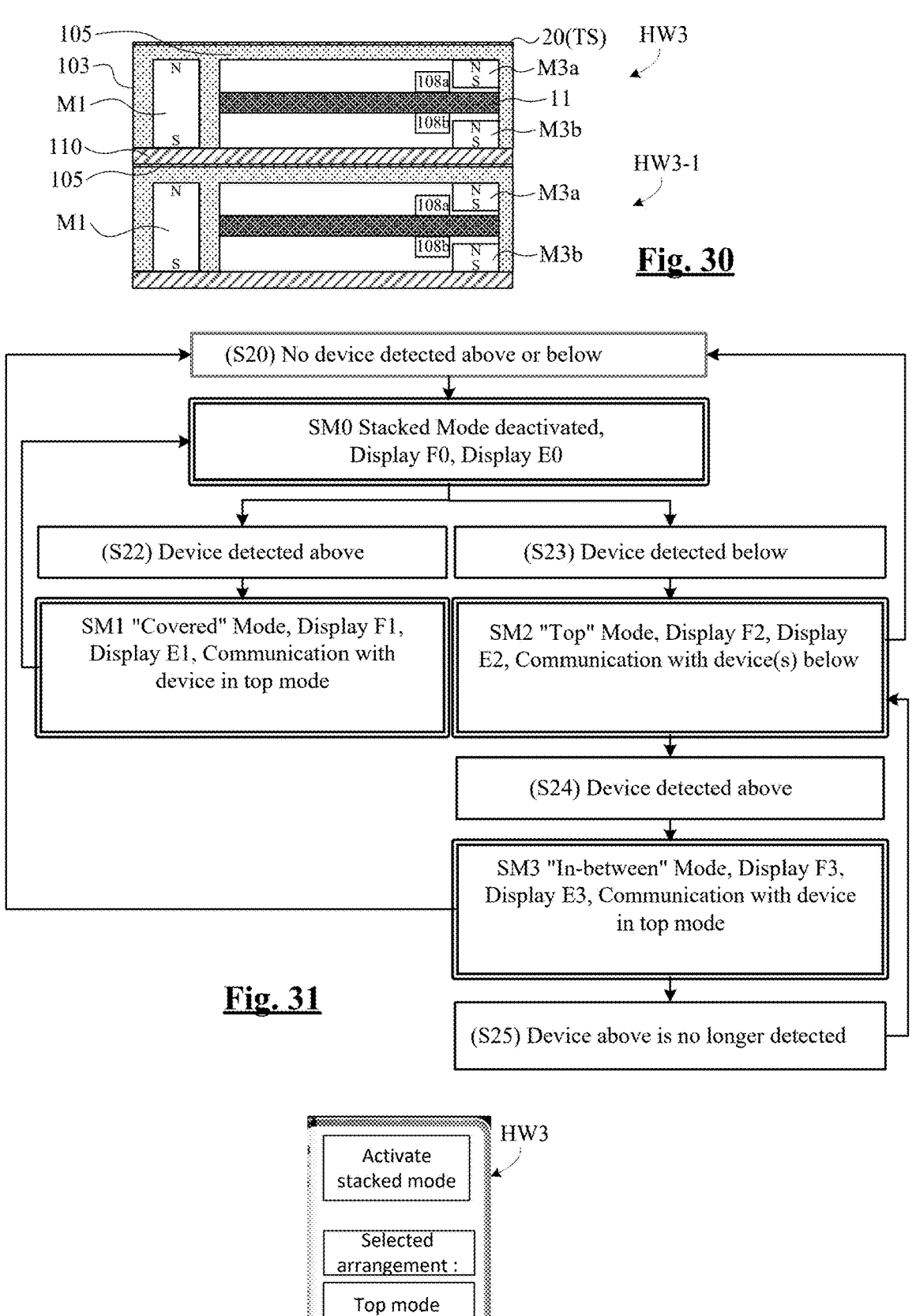

Fig. 30

(S20) No device detected above or below

SM0 Stacked Mode deactivated,
Display F0, Display E0

(S22) Device detected above (S23) Device detected below

SM1 "Covered" Mode, Display F1,
Display E1, Communication with
device in top mode SM2 "Top" Mode, Display F2, Display
E2, Communication with device(s) below (S24) Device detected above SM3 "In-between" Mode, Display F3,
Display E3, Communication with device
in top mode

Fig. 31

(S25) Device above is no longer detected

Activate
stacked mode

Selected
arrangement :

Top mode

Covered mode

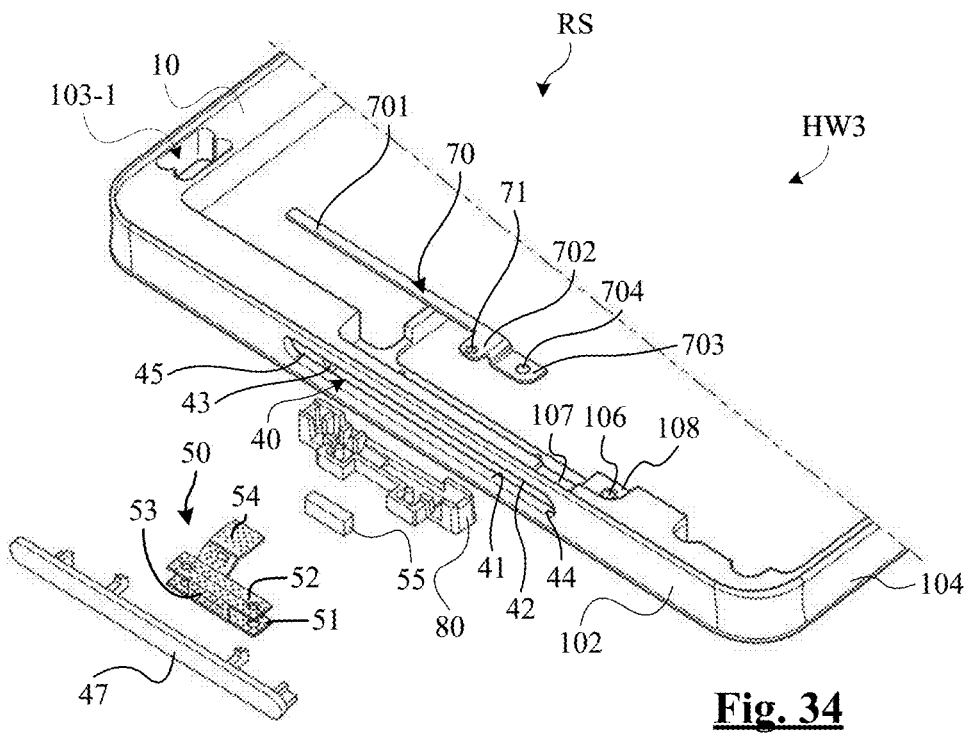
Fig. 34
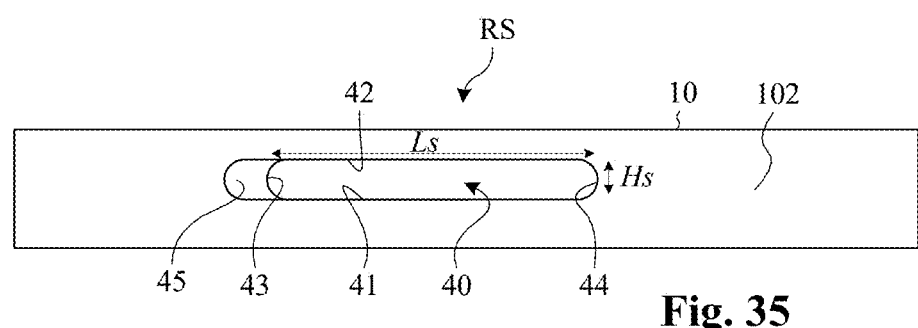
Fig. 35
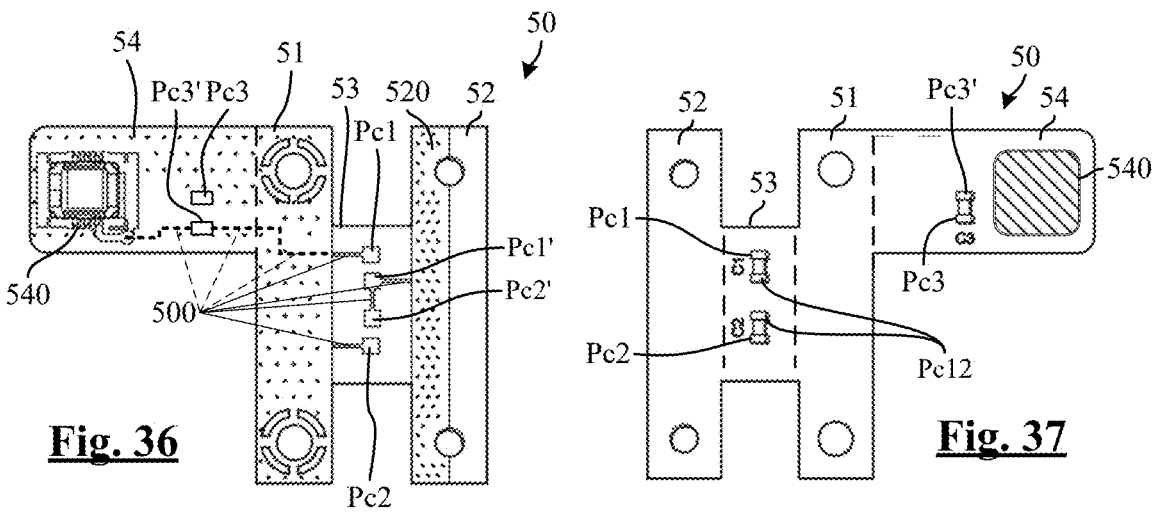
Fig. 36                    Fig. 37

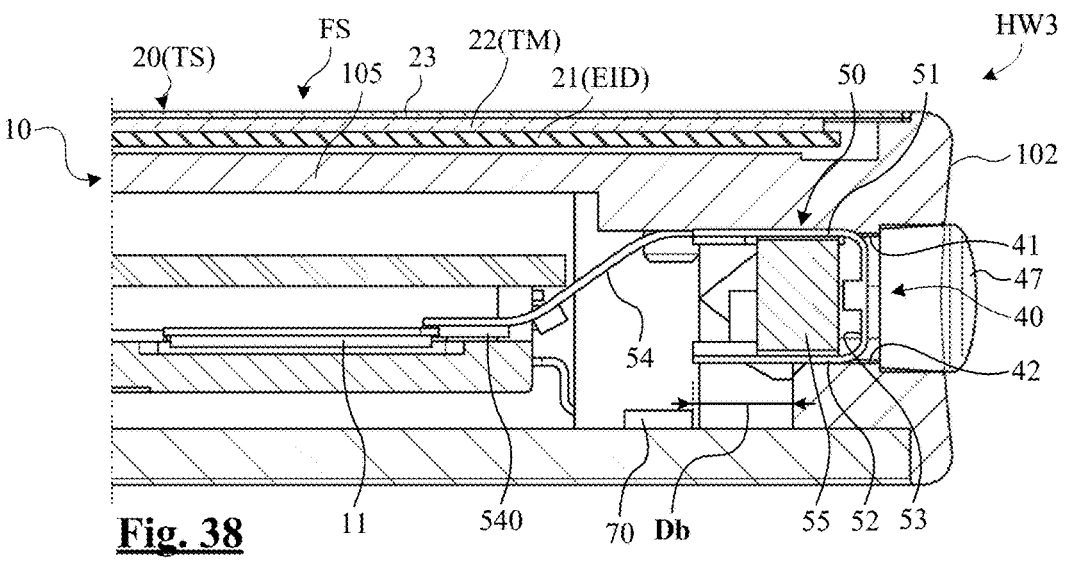
Fig. 38
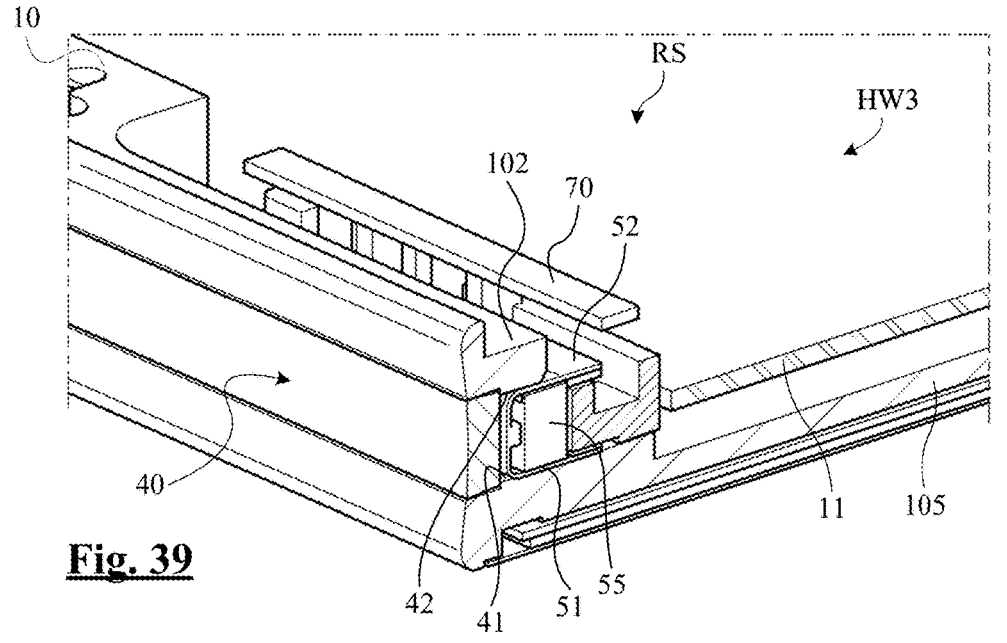
Fig. 39
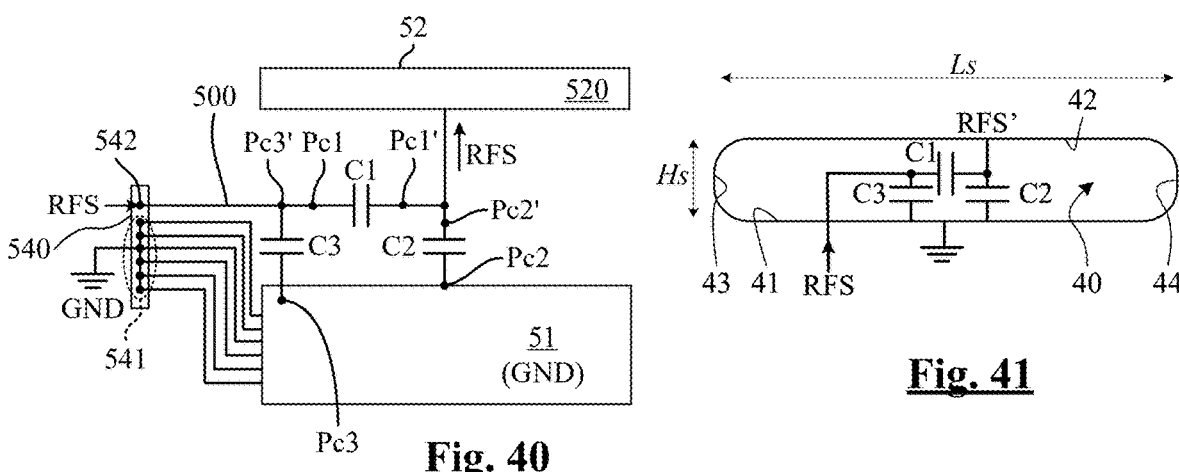
Fig. 40
Fig. 41

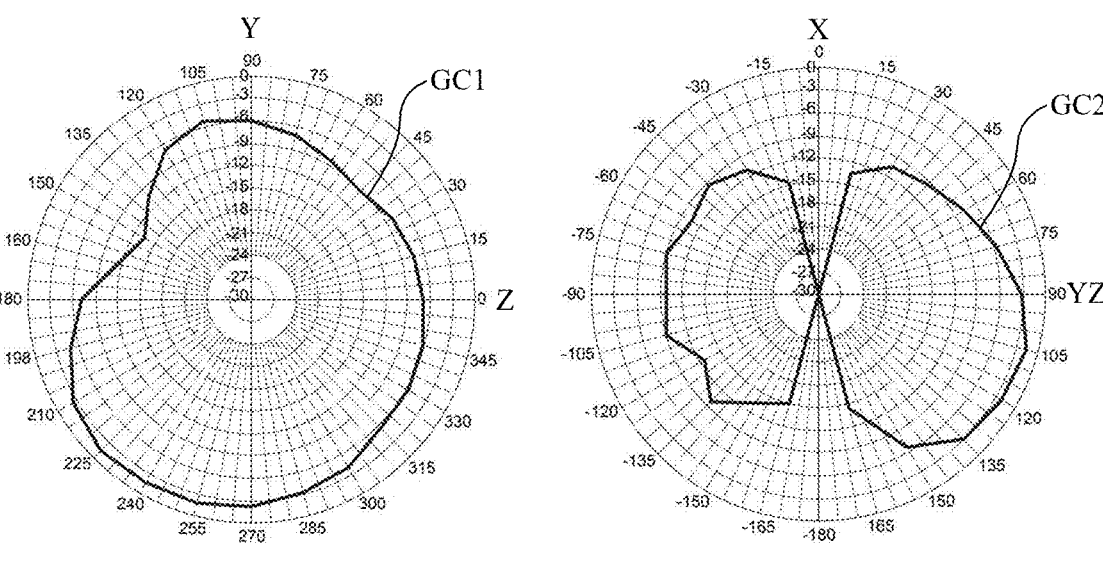
Fig. 49A                    Fig. 49B
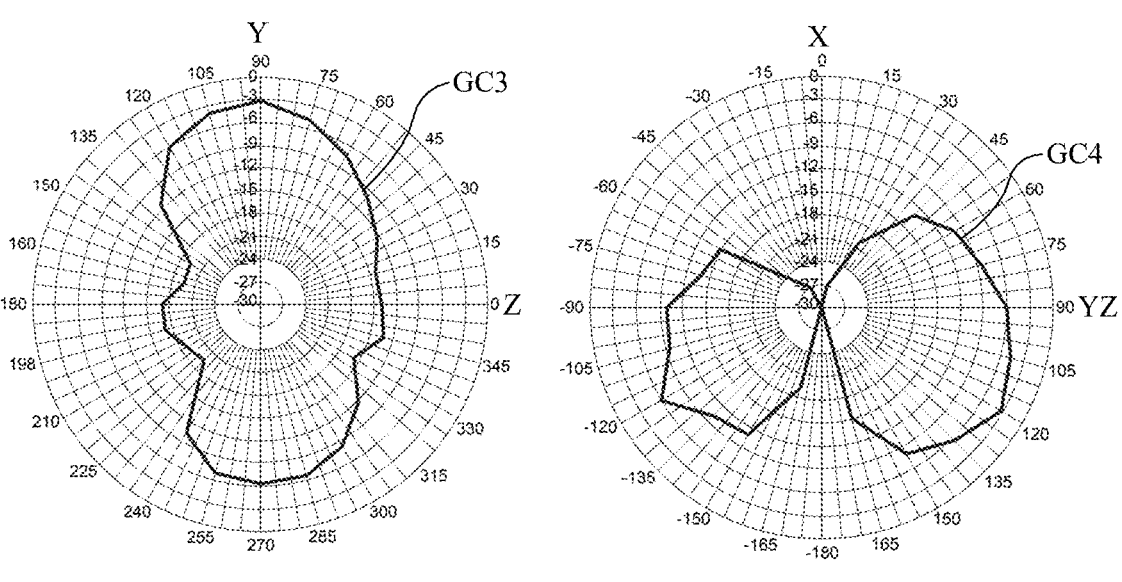
Fig. 50A                    Fig. 50B

SLOTTED ANTENNA COMPRISING AN ELECTRODE RADIOFREQUENCY SIGNAL INJECTOR AND DEVICE COMPRISING SUCH AN ANTENNA

CROSS-REFERENCE TO RELATED APPLICATIONS

This application is a 371 National Stage of International Application No. PCT/FR2023/051383, filed Sep. 11, 2023, which claims priority to French Patent Application No. FR2209380, filed Sep. 16, 2022, French Patent Application No. FR2209381, filed Sep. 16, 2022, French Patent Application No. FR2209382, filed Sep. 16, 2022, French Patent Application No. FR2209384, filed Sep. 16, 2022, and French Patent Application No. FR2209385, filed Sep. 16, 2022, the disclosures of which are herein incorporated by reference in their entirety.

TECHNICAL FIELD

The present disclosure relates to hardware wallets for cold storage of private keys from the blockchain. The present disclosure also relates to the ergonomics of portable electronic devices, and in particular the ergonomics of hardware wallets for cold storage of private keys.

BACKGROUND

In recent years, the development of cryptocurrencies or other types of cryptoassets managed by the blockchain, such as non-fungible tokens (NFTs) and Smart Contracts, has given rise to various ways of storing and holding the private keys attached to these different types of cryptoassets. This is how the notions of "wallet", "cold storage" and "hot storage" of private keys appeared. A "wallet" is a device or program whose function is to manage cryptoassets, and therefore to store the private keys attached to them. So-called "hot wallets" are connected to the Internet and are exposed to hacker attacks or to viruses and malware. These can be wallets managed by centralized exchanges, which do not offer the highest level of security. Thus, many centralized platforms have been pillaged hundreds of millions of dollars by hackers over the years. "Hot" wallets can also take the form of programs installed on mobile phones, tablets or personal computers ("software wallets"). Such wallets are permanently connected to the internet and are therefore themselves exposed to attacks.

Cold wallets are the most secure solution for cold storage of private keys, i.e. removed from direct access to the internet, which reduces the attack exposure and thus the risk of theft by hacking. Transactions involving private keys are signed in an offline environment. Any transaction initiated online is temporarily transferred to the offline hardware wallet, where it is then digitally signed before being transmitted to the online network. Since the private key is not communicated to the online server during the signing process, a hacker cannot access it.

The simplest form of cold storage is the paper wallet. A paper wallet is a document on which the user's public and private keys are written. The document usually has an incorporated QR code that can be scanned to sign a transaction. The disadvantage of this medium is that if the paper wallet is lost, illegible, or destroyed, the user can no longer access their funds.

Hardware wallets are a convenient alternative to paper wallets for storing private keys. In addition, they are usually configured to generate recovery phrases to restore private keys if they are lost. Note that cryptoassets are never stored in a hardware wallet but are recorded on the blockchain. The hardware wallet only stores private keys to manage transactions on the blockchain. Public keys corresponding to private keys point to an address on the blockchain where the assets are effectively located.

As shown in FIG. 1, a hardware wallet HW is never directly connected to the internet. To be usable, the hardware wallet HW must be connected to a host device HDV via a data link LNK, e.g. USB or Bluetooth. The host device HDV may be a computer, a mobile phone or a tablet, and runs so-called "companion" software for conducting transactions on the blockchain BCN, such as the "Ledger live" software developed by the applicant. Alternatively, the hardware wallet HW may be used, through the HDV host device, with decentralized exchanges or DEXs, where the user can transact while keeping their keys.

The hardware wallets HW marketed by the applicant have been commercially successful because of the high degree of security they offer, through the use of a "secure element" to store private keys and sign transactions. A secure element is a hardware platform that can store and manipulate data in compliance with the security rules and requirements set by a trusted authority. It comes in the form of a semiconductor chip that implements various countermeasures against fraudster attacks.

FIG. 2 shows the architecture of a hardware wallet HW1 marketed by the applicant as the "Nano S". The hardware wallet HW1 features a secure element SE1 paired with a microcontroller MCU1. The processor MCU1 has a USB interface U1 and acts as a proxy device for the secure element SE1, for communication with an external host device HDV running a companion application (see FIG. 1). The secure element SE1 has its own Secure Operating System OS (firmware) that allows it to run application programs APP, and incorporates a cryptographic coprocessor CRY. The hardware wallet HW1 also features a display DISP1 and two buttons B1, B2.

The display DISP1 and the buttons B1, B2 are managed by the microcontroller MCU1. These two buttons play an important role in securing certain operations: the user must press both buttons at the same time to demonstrate their agreement or consent for performing or completing the operations.

FIG. 3 illustrates a second hardware wallet HW2 architecture marketed by the applicant as "Nano X", described in more detail in the "Ledger Nano X Security Target" security information notice published on the website of the French National Agency for the Security of Information Systems (ANSSI). (https://www.ssi.gouv.fr/uploads/2019/10/anssi-cible-cspn-2019_12en.pdf)

The hardware wallet HW2 includes, like the wallet HW1, a secure element SE2, a microcontroller MCU2 with a USB interface U1, a display DISP2 and two buttons B1 and B2. It also features a battery BAT that can be charged via the USB interface and a Bluetooth communication interface BT1 managed by the microcontroller.

As before, the user must press both buttons at the same time to express their agreement or consent when performing certain sensitive operations, as stated in the aforementioned document "Ledger Nano X Security Target", paragraph 1.2 "Terminology", line "Consent": "The security concept of the Ledger Nano X is reinforced by the end user. As soon as a sensitive operation is required, the end user must confirm the operation using the two buttons".

Unlike the hardware wallet HW1, the display DISP2 and the buttons B1, B2 of the hardware wallet HW2 are managed directly by the secure element SE2, which provides an additional degree of security in case of corruption of the microcontroller MCU2. Thus, the signals received by the secure element SE2, indicating that the user is pressing both buttons B1 and B2 at the same time, cannot be tampered with through the microcontroller. Similarly, the information presented to the user by the screen DISP2, such as the amount of a transaction that must be validated by the user, cannot be falsified.

In summary, in a hardware wallet for the cold storage of private keys within the meaning of the present application, the microcontroller associated with the secure element does not execute any application program and has the sole function of managing communication devices, USB, Bluetooth, etc. as well as other peripherals (battery, battery charger, etc.). All application programs are run by the secure element.

In addition, there are devices DV1 whose conventional architecture is shown in FIG. 4, which include a microcontroller SMCU including a trust zone TZ. The trust zone TZ can in some cases be associated with a secure element SE to which it entrusts the most sensitive operations or cryptographic calculations. The implementation of such a trust zone TZ is typically based on the use of two virtual processors combined with hardware access control. This allows the core of an application program to switch between two states, called "worlds," in order to prevent information from being leaked from the most trusted world to the least trusted world. Each world can operate independently of the other while using the same core. Memory and devices are then informed of the kernel's operating world and can use it to provide access control to the device's secrets and code. Typically, the microcontroller SMCU runs a so-called "rich" operating system ROS in the least secure world, and a smaller, security-specialized code in the most secure world, to reduce exposure to attacks. The rich operating system is usually Android.

This type of device does not need to be attached to a host device to perform operations on the blockchain and typically includes a Wi-Fi communication interface WF1 in addition to USB U1 and Bluetooth BT1 communication interfaces. Thanks to its rich operating system, it offers extensive features and very advanced ergonomics, including a large touchscreen like those found in smartphones. The device DV1 may, in some cases, be equipped with mobile phone circuits and form a full-fledged mobile phone equipped with a private key storage feature.

In practice, and despite the undeniable ergonomic advantages it offers, such a device DV1 is not immune to attack and does not meet the same rigorous security requirements as hardware wallets for cold storage of private keys, which do not have an internet connection and whose microcontroller never executes application programs.

On the other hand, hardware wallets for the cold storage of private keys offer only poor ergonomics, making some transactions difficult to conduct, due to a small display and the requirement to provide two buttons to validate certain sensitive operations.

It may therefore be desired to improve the ergonomics of hardware wallets, without altering the high degree of security they offer.

In addition, some cryptoasset holders use multiple hardware wallets to store crypto assets of different types or values. For example, a user may use a first hardware wallet dedicated to the management of cryptocurrency accounts of low monetary value, to carry out daily transactions or pay for purchases, a second hardware wallet dedicated to the management of cryptocurrency accounts of high monetary value, a third hardware wallet dedicated to the management of cryptoassets such as non-fungible tokens, etc. It could therefore also be desired to improve the ergonomics of hardware wallets for users who use several such wallets.

More generally, it could be desirable to provide improvements applicable to portable electronic devices, and in particular to hardware wallets for the storage of private keys, which improve their ergonomics, or which provide new functionalities, or which improve their performance in terms of Bluetooth communication when equipped with such means of communication.

SUMMARY

Embodiments relate to an electronic device comprising a chassis of an electrically conductive material, comprising a front side, a rear side and a side wall a closed-slot antenna for transmitting or receiving data in a specified frequency band, made in the side wall of the chassis and having a radiation axis substantially perpendicular to the side wall, and a wireless communication circuit configured to provide a radio frequency signal to the radio frequency antenna, the closed-slot antenna comprising a longitudinal port in and through the side wall of the chassis. The device comprises a radio frequency signal injector for applying a ground voltage to a first surface of the longitudinal port and applying the radio frequency signal to a second surface of the longitudinal port, the signal injector comprising two flat electrodes substantially parallel to each other, the first electrode resting on the first surface of the longitudinal port and the second electrode resting on the second surface of the longitudinal port, and a compression element of a flexible and elastic material, arranged between the two electrodes and exerting on them a spreading force which presses the first electrode against the first surface of the longitudinal port and presses the second electrode against the second surface of the longitudinal port.

According to an embodiment, the two flat electrodes have a contact surface with the first and second surfaces of the longitudinal port which is a function of their length, and each having a length which is at least equal to one quarter of the length of said surfaces.

According to an embodiment, the radio frequency signal injector comprises electrical conductors and electronic components connecting the first and second electrodes.

According to an embodiment, the length of the longitudinal port is close to one-quarter of the wavelength of a radio frequency signal of frequency 2.4 GHz, i.e., 30.6 mm, within a few millimeters or tenths of a millimeter to account for the presence of an open-slot parasitic antenna.

According to an embodiment, the device also comprises an open-slot parasitic antenna having a radiation axis substantially perpendicular to the radiation axis of the closed-slot antenna, the open-slot parasitic antenna comprising an electrically conductive arm arranged parallel to and in the vicinity of the longitudinal port, the electrically conductive arm having a free end and an end electrically connected to the side wall of the chassis.

According to an embodiment, the connected end of the arm is electrically connected to the side wall of the chassis in the vicinity of one end of the second surface of the longitudinal port receiving the radio frequency signal.

According to an embodiment, a length and a height of the longitudinal port, a length of the electrically conductive arm and an orthogonal distance between the electrically conductive arm and the side wall of the chassis are configuration parameters of the closed-slot antenna and the open-slot parasitic antenna, and wherein the closed-slot antenna and the open-slot parasitic antenna form a resulting antenna whose gain in the specified frequency band is greater than −5 dB when the chassis of the device is in open air and remains greater than −5 dB when the rear side of the chassis faces an electrically conductive surface.

According to an embodiment, the closed-slot antenna and the open-slot parasitic antenna are configured so that when the rear side of the chassis faces an electrically conductive surface, the radiation from the closed-slot antenna is predominant over the radiation from the open-slot parasitic antenna.

According to an embodiment, the electrically conductive arm comprises, as an extension of its end electrically connected to the side wall of the chassis, a base attached to the side wall of the chassis, and a projecting contact resting on a contact surface provided in the side wall of the chassis.

According to an embodiment, the electrically conductive arm is mounted under elastic flexion between its base attached to the side wall of the chassis and the projecting contact resting on the contact surface provided in the side wall of the chassis, the elastic flexion exerting pressure on the projecting contact resting on the contact surface.

According to an embodiment, the electrically conductive arm is arranged in a guide member of plastic material ensuring parallelism of the arm with respect to the side wall of the chassis.

According to an embodiment, the chassis has on its front side an electrically conductive plate forming a first screen to the radiation emitted by the open-slot parasitic antenna, and wherein the closed-slot antenna and the open-slot parasitic antenna are configured so that, when the chassis is in open air, the open-slot parasitic antenna has a tuning frequency within the specified frequency band while the closed-slot antenna has a tuning frequency outside the specified frequency band, and when the rear side of the chassis faces the front side of a similar device or an electrically conductive surface forming a second screen to the radiation emitted by the open-slot parasitic antenna, the closed-slot antenna has a tuning frequency within the specified frequency band while the open-slot parasitic antenna has a tuning frequency outside the specified frequency band.

According to an embodiment, the device forms a hardware wallet for the cold storage of cryptographic keys from the blockchain and comprising a microcontroller and a secure element.

According to an embodiment, the chassis is made of an electrically conductive non-magnetic material and has magnets for magnetically stacking the device with a similar device.

According to an embodiment, the specified frequency band is the Bluetooth band or a Wi-Fi band.

BRIEF DESCRIPTION OF DRAWINGS

Exemplary embodiments of improvements to portable devices will be described non-limitingly below, in relation to the attached figures, including:

FIG. 4 shows a conventional electronic device architecture offering a medium degree of security, FIG. 5 shows an advanced hardware wallet architecture, FIG. 22 is an abstract representation of an arrangement of magnets in the casing of a portable electronic device, FIG. 23 shows the dimensions of a magnet, FIG. 24 is a cross-section view of a magnetic stack of hardware wallets, FIG. 25 is a cross-section view of a variant of a magnetically stackable hardware wallet, FIG. 26 is a cross-section view of another variant of a magnetically stackable hardware wallet, FIG. 30 is a cross-section view of a stack of hardware wallets fitted with sensors, FIG. 31 describes a method for automatically managing a stack of hardware wallets, FIG. 32 shows another example of a menu on the screen of a hardware wallet stacked with other hardware wallets, FIG. 33 describes a process for manually managing a stack of hardware wallets, FIG. 34 is an exploded view of a hardware wallet comprising an antenna, FIG. 35 is a front view of the hardware wallet of FIG. 34 and shows an antenna element, FIG. 36 is a top view of another antenna element, FIG. 37 is a bottom view of another antenna element, FIG. 38 is a cross-section view of the hardware wallet of FIG. 34, FIG. 39 is a cross-section and perspective view of the hardware wallet of FIG. 34, FIG. 40 is an electrical diagram of the antenna element of FIGS. 36, 37, FIG. 41 is an equivalent diagram of a portion of the hardware wallet antenna of FIG. 34, FIGS. 42 and 43 are bottom and perspective views of the hardware wallet of FIG. 34, FIGS. 49A, 49B, 50A and 50B show other properties of the antenna of FIG. 45 in two different uses.

DETAILED DESCRIPTION

Figure 1:
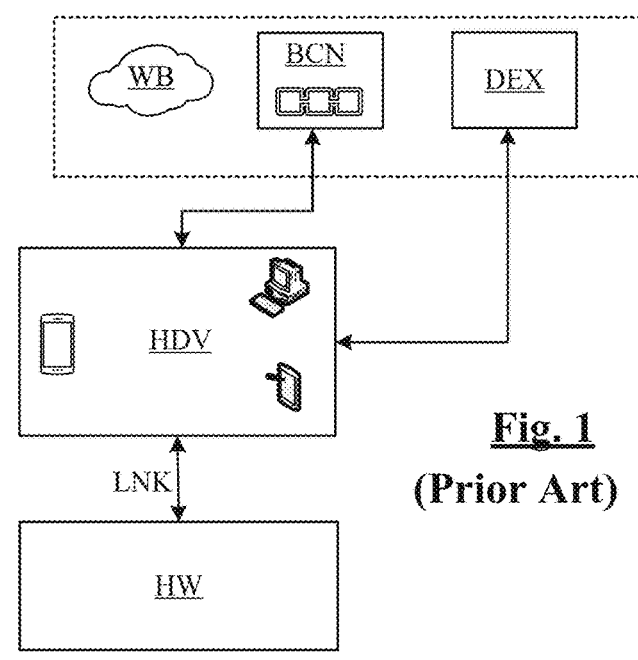
FIG. 1 shows conventional examples of hardware wallet usage through a host device.
Figure 2:
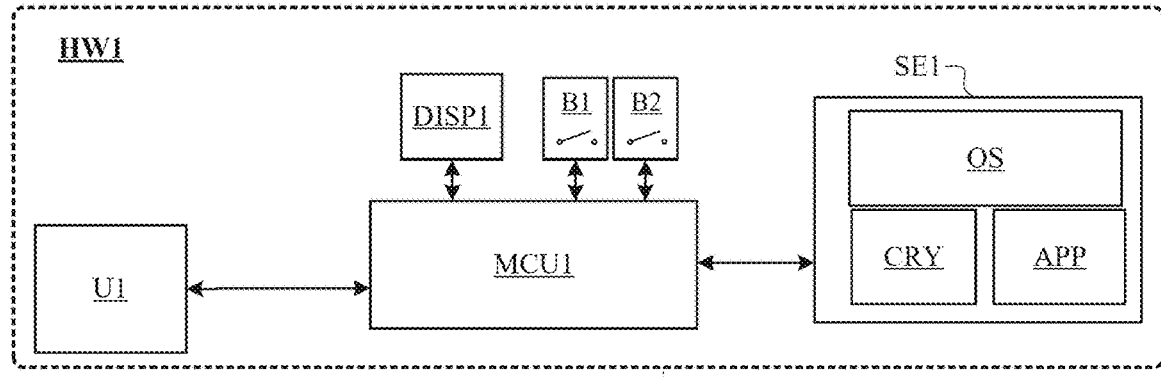
FIG. 2 shows a conventional hardware wallet architecture.
Figure 3:
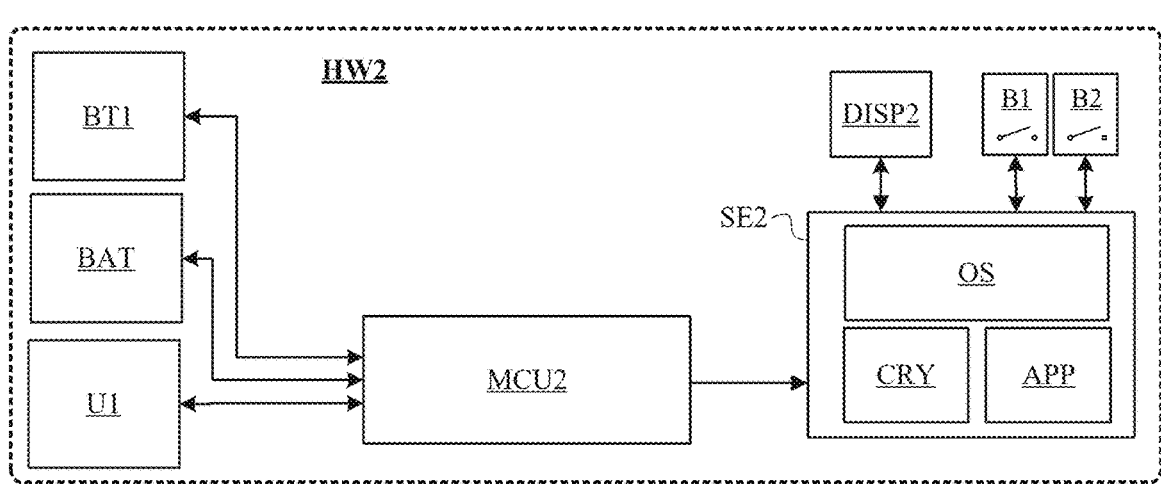
FIG. 3 shows another conventional hardware wallet architecture.

Improvements to hardware wallets for cold storage of private keys are described in the following. Some improvements may be implemented in all types of portable electronic devices, and therefore have a scope of application that goes far beyond the sole fabrication of hardware wallets.

Example of a Hardware Wallet with a Touchscreen Controlled by a Secure Element As noted above, a secure element is a hardware platform that implements various countermeasures to prevent fraudster attacks. Schematically, an attack may include:

Inspection and/or reverse engineering attacks (grinding, layer removal, thermal imaging, X-rays, scanning electron microscopy), Side-channel attacks (analysis of power consumption, electromagnetic radiation, computation time, or any other measurable physical quantity correlated with the value of a secret that the attacker is trying to discover), or Fault injection attacks with a laser or test spikes (e.g. injection of spurious or "glitched" signals on power lines, clock lines or data buses).

The countermeasures provided for in a secure element are numerous. Some are software and others are hardware (code protected against attacks, means of protection of volatile and non-volatile memories, means of masking power consumption, data masking, means of masking the topography of the integrated circuit, voltage, frequency, light, temperature sensors, allowing attacks to be detected, etc.). In the event of an attack, the operating system of a secure element is designed to initiate defensive actions such as interrupting a computation in progress, permanently blocking the circuit or self-destructing it by completely erasing its memory.

Due to the many countermeasures they implement, the secure elements are complex and expensive to manufacture. The functionalities they offer are therefore limited, especially when it comes to the number of inputs/outputs they offer. As a result, the secure elements are not generally used to control screens, and when they are, as in the product "NanoX" marketed by the applicant, it is to control small screens without any touch-sensitive function.

Thus, considering the secure elements available on the market, and in particular those that offer a security level at least equal to 5 on the Evaluation Assurance Level (EAL), corresponding to level E4 of the European Information Technology Security Evaluation Criteria (ITSEC) and level B2 of the American Trusted Computer System Evaluation Criteria (TCSEC), to date, the applicant is not aware of any secure element that has more than 10 inputs/outputs. Indeed, the higher the number of IOs, the larger the attack exposure of the secure element.

It will be noted here that "IOs" refers to 1-bit digital ports that can be used to transmit or receive logic signals, this number of IOs being less than the number of electrical pins of a secure element, which include in addition to the 10 pins power supply, ground, and possibly reset pins, etc.

In the context of this improvement, however, it has been found that it may be possible to manage a touch screen with a secure element. Indeed, a secure element with 10 IOs can handle the following serial links:

1) an ISO/IEC 7816 link, which has only three logic signals CLK (clock), I/O (data) and RST (Reset);

2) an SPI (Serial Peripheral Interface) bus that uses only 4 signals:

SCLK (Serial Clock) (generated by the master),
MOSI (Master Output, Slave Input),
MISO (Master Input, Slave Output), and
SS (Slave Select);

3) an I2C bus (Inter Integrated Circuit Bus) which has only two signals:

SDA (Serial Data Line): bidirectional data line,
SCL (Serial Clock Line): bidirectional synchronization clock line, i.e. a total of 9 IOs required.

It has also been found that certain types of displays and certain types of touch modules can be controlled with an SPI bus or an I2C bus. It is also possible to connect a secure element and a microcontroller via an ISO/IEC 7816 smart card link, or an SPI, I2C, USB link, and others.

Finally, managing a touch screen requires the processing of an interrupt signal that the touch screen issues each time a touch event is detected. Such an interrupt signal activates a touch event handling routine. The reception of such a signal therefore requires mobilizing another I/O of a secure element, i.e. 10 IOs in total. In the context of this improvement, it has therefore been found that the use of a secure element to control a touch screen is not impossible.

Thus, according to an initial improvement, a hardware wallet is provided including a touch screen controlled exclusively by a secure element, via one or more serial links. Subject to certain precautions that will be set forth below, such a touchscreen can significantly improve the comfort of the user interface, while meeting the security requirements applicable to hardware wallets. According to this improvement, the touch screen has a diagonal greater than or equal to 3 inches (i.e. 7.62 cm, one inch being equal to 2.54 cm), but preferably greater than or equal to 3.5 inches (i.e. 8.89 cm), and features at least 600×400 pixels. In an embodiment, the screen has a diagonal of 3.9 inches (9.906 cm) and features 670×496 pixels.

Hardware Wallet Hardware Implementation Example

FIG. 5 shows a general architecture of a hardware wallet HW3 according to this improvement. The device HW3 comprises a secure element SE3, a microcontroller MCU3 and a touchscreen TS. The touchscreen TS comprises an E-Ink display EID and a touch module TM. The touchscreen TS is under the exclusive control of the secure element SE3. For this purpose, the I/O resources of the secure element SE3 are divided into three I/O groups: IOGA, IOGB, IOGC. The I/O group IOGA is assigned to implement a bus BS1 connecting the secure element SE3 to the microcontroller MCU3. The I/O group IOGB is assigned to implement a bus BS2 connecting the secure element SE3 to the display EID, and the I/O group IOGC is assigned to implement a bus BS3 connecting the secure element SE3 to the touch module TM. The bus BS1 is for example an IEC/ISO 7816 bus, the bus BS2 is for example an SPI bus and the bus BS3 an I2C bus. An inverse arrangement could be provided, with BS2 an I2C bus and BS3 an SPI bus, or another serial link protocol compatible with the resources of the secure element. The SPI bus is managed on the display EID side by a chip integrated into the display EID, such as the UltraChip® UC8177. The I2C bus is managed on the touch module TM side by a chip integrated into it, for example the Goodix® GT1151QM chip. The secure element is for example an ST33K1M series STMicroelectronics® chip and the microcontroller an STM32 series STMicroelectronics® chip.

The device HW3 also includes various peripherals controlled by the microcontroller MCU3, such as:

A battery BAT;

A power management IC PMIC, e.g. the NXP PCA9420 chip. The circuit PMIC receives a voltage Vat from the battery when the battery is charged, supplies the voltage Vat to the battery when the battery needs to be charged, and provides a regulated supply voltage Vdc to the microcontroller MCU3, the secure element SE3, and the touchscreen TS;

An antenna QiA for inductive battery charging in accordance with the Qi technology (https://www.wirelesspowerconsortium.com/qi/). The antenna QiA is connected to a Wireless Charging Integrated Circuit (WCIC), for example the EPIC® 103AHQI01 chip. The circuit WCIC provides a voltage Vqi to the circuit PMIC for battery charging;

A USB port U1. The USB port provides the circuit PMIC with voltage Vusb for battery charging, provides the microcontroller MCU3 with data DTu received from an external device connected to the USB port, and transmits data DTu to the external device;

A Bluetooth antenna BTA, receiving a radio frequency signal RFS provided by a circuit BTM for managing Bluetooth communications. Although represented as a separate block from the microcontroller MCU3, the circuit BTM may be included in the microcontroller MCU3. The circuit BTM provides data DTb exchanged with an external device via a Bluetooth link or transmits data DTb to the external device via the Bluetooth link.

The device HW3 therefore has the advantage of having a touch screen exclusively controlled by the secure element SE3 and therefore not exposed to corruption, even in the event of an attack on the microcontroller MCU3. The latter does not run any application programs and does not store any of the cryptographic secrets used by the secure element. It only manages the peripherals and acts as a proxy processor with respect to the secure element, transmitting to it the data DTb, DTu received by the communication interface chosen by the user, or transmitting data DTb, DTu provided by the secure element to the external device. The device HW3 therefore does not offer any possibility of direct connection to the Internet and remains, despite its touch screen, a hardware wallet for the cold storage of private keys offering a high level of security.

The secure element SE3 also includes a memory space MEM including a read-only memory area (ROM memory), a programmable and electrically erasable non-volatile memory area (flash memory) and a volatile memory area (RAM). The programmable and electrically erasable non-volatile memory area receives an operating system OS3 from the secure element. The OS is configured to allow the use of the touchscreen TS by application programs.

Hardware Wallet Software Implementation Example

Figure 6:
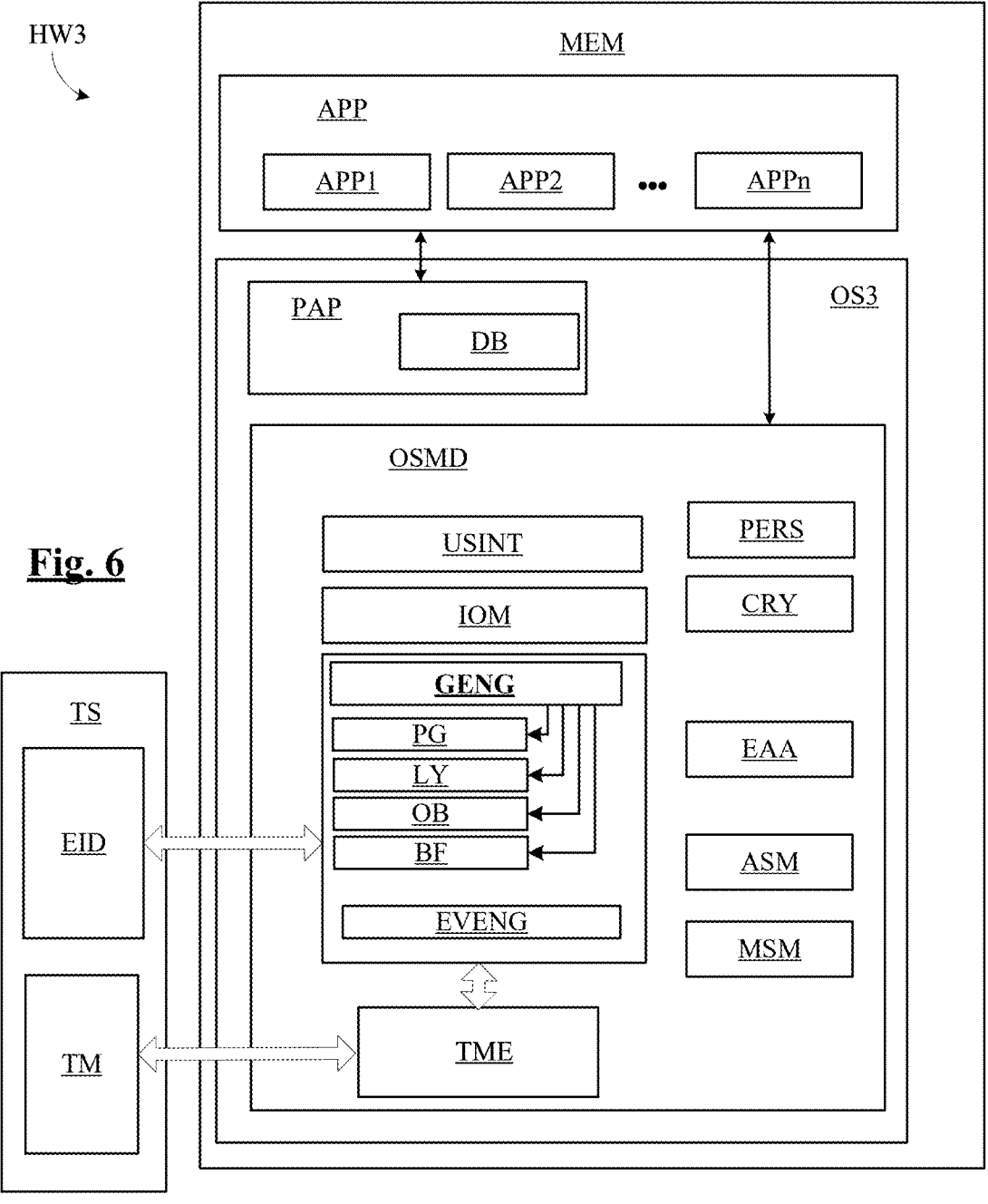
FIG. 6 shows an organization of a portion of a non-volatile memory in the hardware wallet of FIG. 5.

In connection with the example of hardware architecture that has just been described, FIG. 6 schematically shows an example of the organization of the programmable and electrically erasable non-volatile memory area of the memory space MEM. The memory space MEM includes an area APP for storing application programs APP1, APP2 . . . APPn and a zone receiving the operating system OS3. The operating system OS3 comprises a privileged applications memory area PAP storing a dashboard DB for the privileged application programs, and an operating system modules memory area OSMD storing operating system modules. The memory area OSMD includes:

A user interface management module USINT,

A device customization module PERS,

A cryptography module CRY combined with a cryptographic coprocessor integrated into the secure element, or hardware accelerators for advanced cryptographic functions, An endorsement and application attestation module EAA, An IO management module IOM for managing communication interfaces.

The memory area OSMD also contains, according to the present improvement, a graphics engine GENG configured to manage the electronic ink display EID. The GENG graphics engine includes:

Preconfigured pages PG,

Preconfigured layouts LY,

Preconfigured objects OB, and

Basic forms of BF.

The access by application programs to the EID viewer is therefore under the control of the OS3 operating system of the secure element, which first verifies the authenticity and legitimacy of the programs before making the graphics engine available to them.

The memory area OSMD also includes, according to this improvement, a touch management engine TME that provides authorized application programs with the possibility of accessing and interpreting the data emitted by the touch module TM.

The graphics engine GENG also includes an event management engine EVENG that receives touch information provided by the touch engine TME and searches correlations with display areas, to distinguish between non-significant taps by the user on the screen and significant taps.

In an embodiment that preserves the limited resources of the secure element in terms of random access memory (RAM), the graphics engine GENG operates without RAM allocation. The image pixels are transferred to a RAM in the display without reloading them. In another embodiment that can be combined with the previous one, the graphics engine GENG does not handle preconfigured pages PG, preconfigured layouts LY, and preconfigured objects OB. Thus, the "work" that the operating system achieves is minimized and is limited to the basic forms BF, as it does not need to dynamically create objects. The handling of complex shapes is left to the application programs, whose code is designed with preconfigured graphical elements that minimize the operations that the graphics engine must perform.

Figure 7:
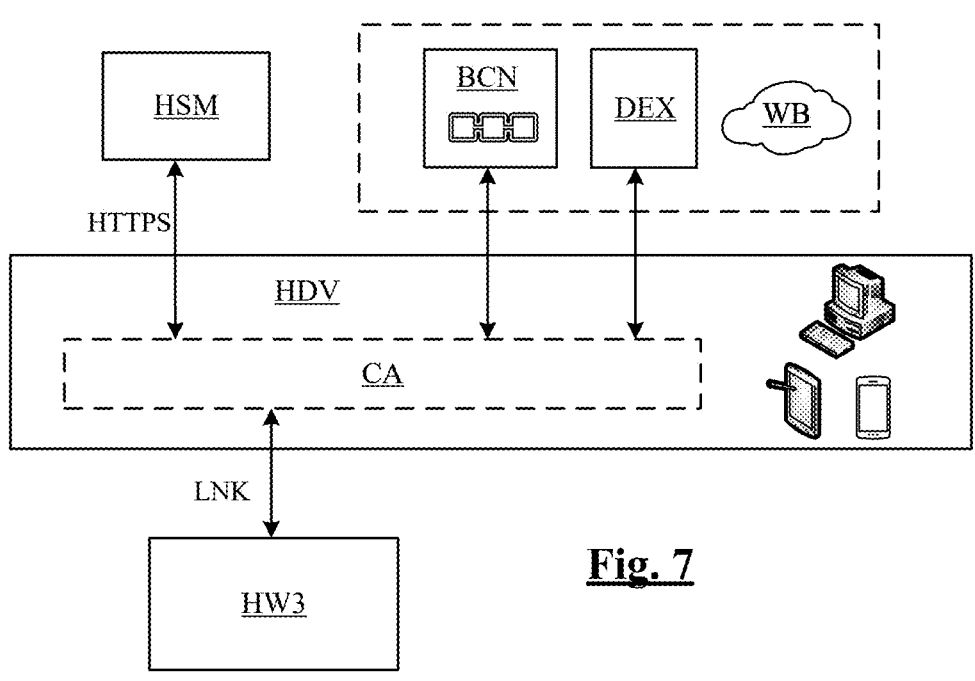
FIG. 7 shows examples of use of the hardware wallet of FIG. 5.

FIG. 7 shows use examples of the hardware wallet HW3. Since the wallet cannot connect directly to the Internet, a connection is established with a host device HDV connected to the Internet ("WB") and running a companion application CA, e.g. the "Ledger Live" application (https://www.ledger.com/fr/ledger-live). The device HW3 can then interact with the companion software to transact on the blockchain BCN or decentralized exchanges DEX.

The hardware wallet HW3 is also managed by a transactional black box, i.e. Hardware Security Module HSM, located in a data center, to which the hardware wallet HW3 connects via a secure HTTPS link. The transactional black box does not store any private key and only ensures the verification of the authenticity of the device, its commissioning, the update of its operating system, the download of certified application programs, etc.

Embodiment Including Validation of Sensitive Transactions by Means of Two Virtual Buttons Although the secure use of a touch screen exclusively controlled by the secure element offers certain ergonomic advantages, the abandonment of the two conventional buttons whose simultaneous pressing secures certain sensitive operations could prove detrimental to the security of the device.

Figure 8:
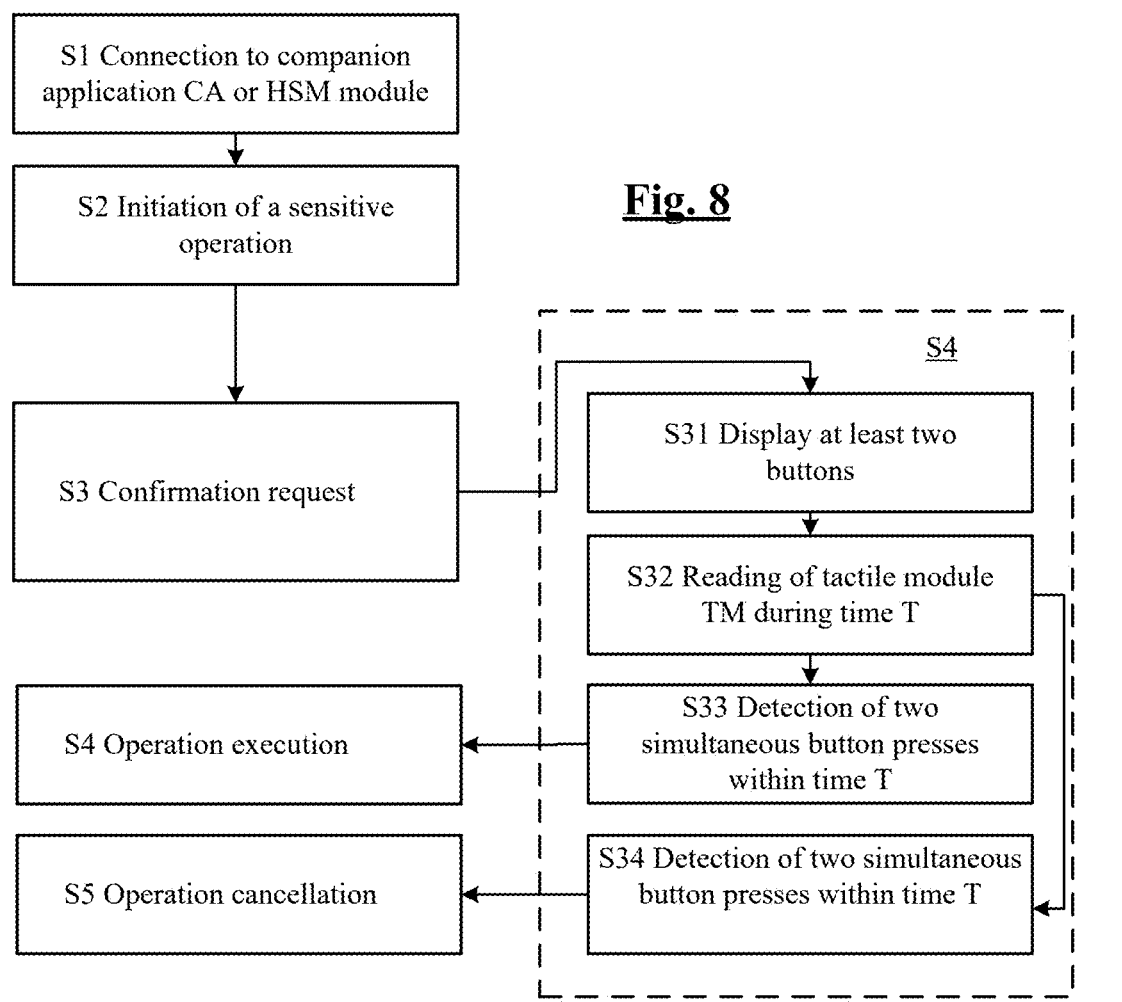
FIG. 8 is a flowchart describing a process for securing certain operations when using the hardware wallet of FIG. 5.

Thus, in one embodiment, the operating system is configured to emulate, by means of the touch screen, the two hardware buttons of the prior art. FIG. 8 illustrates as an example the execution of a sensitive operation in which the user's approval must be secured:

At a step S1, the device HW3 connects to the companion application CA or the HSM module depending on the type of operation to be performed, e.g. performing a transaction or displaying a recovery phrase, through the companion application CA, activating and configuring the device, or downloading an application program through the HSM, etc.

At a step S2, the device HW3 initiates the execution of the sensitive operation, At a step S3, the device HW3 displays on the display EID a request for confirmation, by the user, that the sensitive operation may be carried out, and awaits confirmation. The confirmation awaiting includes a step S31 where the device HW3 displays at least two virtual buttons on the display EID, preferably far apart. The buttons can have any graphics or fancy graphics of the designer's choice. This step is followed by a waiting stage S32 where the device HW3 reads the information provided by the touch module TM in a loop for a time T. If, before the expiry of time T, the device HW3 detects, at a step S33, two simultaneous presses of the user on the two buttons, the device then performs (or completes) the operation at a step S4. If, at the expiration of time T, the device HW3 finds, at a step S34, that the user has not committed the operation, the device cancels the operation at a step S5.

Exemplary Embodiment of a Hardware Wallet with Certain Types of Peripheral Components Imposing Specific Constraints As noted above, commercially available certified security elements offer only a small number of inputs/outputs, typically a maximum of 10 inputs/outputs. Indeed, secure elements are generally designed to be included in smart cards or in objects connected to the Internet to secure the Internet of Things, especially in the field of professional applications. A secure element with only 10 inputs/outputs is therefore not designed to drive a large touchscreen (other electrical pins in a secure element, such as power or ground pins, are not considered inputs/outputs as described above).

Thus, in the above, the following use of the resources of the secure element has been proposed as an example:

Two inputs/outputs to manage the I2C bus connected to the touch module TM (SDA, SCL signals), Four inputs/outputs to manage the SPI bus of the display EID (SCLK, MOSI, MISO, SS), Three inputs/outputs to manage the ISO/IEC 7816 bus between the secure element and the microcontroller (I/O, CLK and RST).

In addition to these 9 inputs/outputs, a further input/output of the secure element is reserved for receiving an interrupt signal issued by the touch module TM when a touch event is detected, to place the secure element in a touch event processing routine. Under these conditions, all 10 inputs/outputs of the secure element are used.

Figure 9:
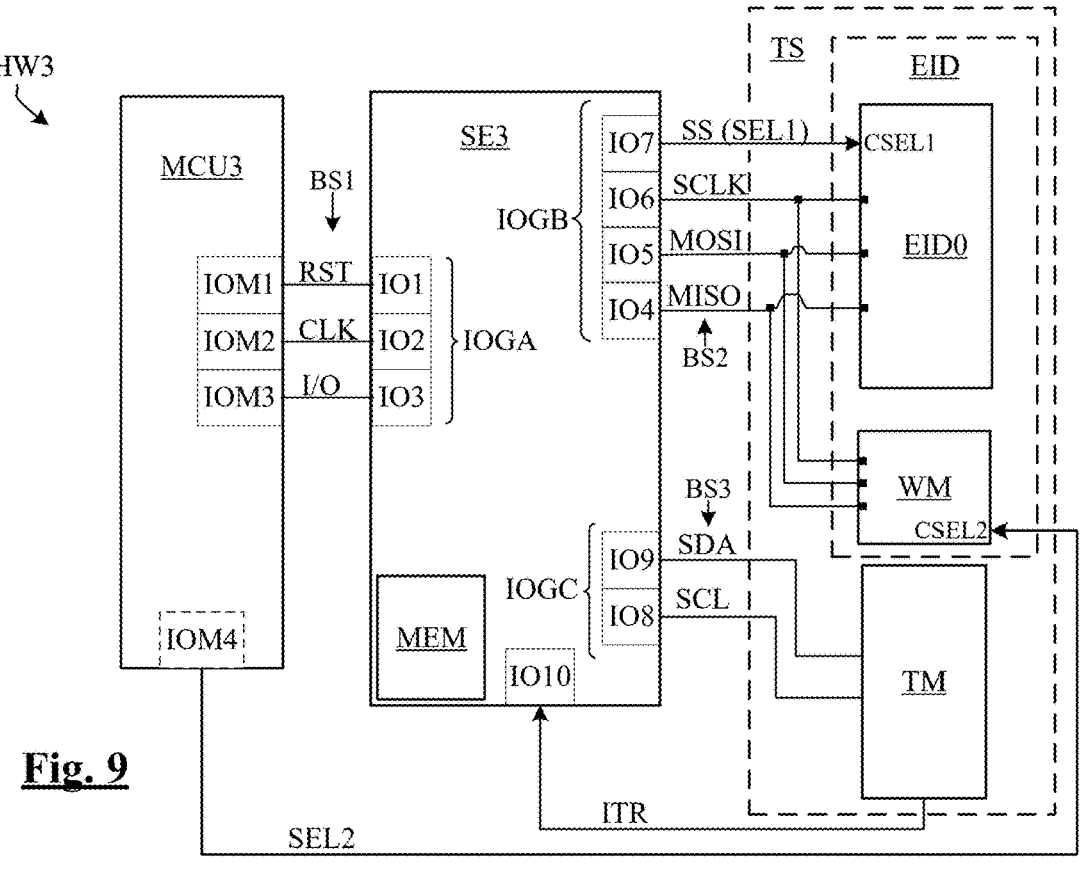
FIG. 9 shows an embodiment of the hardware wallet of FIG. 5, FIG. 10 describes steps for testing a component shown in FIG. 9.

However, in some embodiments, the display EID may include a configuration component that needs to be set up and that is only accessible via a dedicated serial link to that component. As shown in FIG. 9, the display EID can for example include a display module EID0 and a configuration component WM of the display module EID0. The configuration component WM is, for example, a programmable and electrically erasable non-volatile memory receiving a waveform library, which is connected to the display module EID0 by internal circuitry. The configuration component WM has its own inputs/outputs that are compatible with an SPI bus.

Since the secure element SE3 accesses the configuration device WM to program or delete data therein, the bus BS2 is used to control both the display module EID0 and the configuration component WM. In particular, the bus BS2 wires that convey the SCLK, MOSI, and MISO signals are connected to inputs/outputs of both the display module IED0 and the configuration component WM. The SS signal of bus BS2 is applied only to a chip select input CSEL1 of the display module EID0, to which it applies a selection signal SEL1.

In summary, the I/O assignment of the secure element SE3 shown in FIG. 9 is as follows:

1) Bus BS1 (ISO/IEC 7816), IOGA I/O groups:

An input/output IO1 of the secure element SE3 is used to manage the signal RST and is connected to an input/output IOM1 of the microcontroller MCU3, An input/output IO2 of the secure element SE3 is used to manage the signal CLK and is connected to an input/output IOM2 of the microcontroller MCU3, An input/output IO3 of the secure element SE3 is used to manage the signal RST and is connected to an input/output IOM3 of the microcontroller MCU3, 2) Bus BS2 (SPI), IOGB I/O groups:

An input/output IO4 of the secure element SE3 is used to manage the MISO signal and is connected to both an input/output of the display module EID0 and an input/output of the configuration component WM of the display module EID0, An input/output IO5 of the secure element SE3 is used to manage the MOSI signal and is connected to both an input/output of the display module EID0 and an input/output of the configuration component WM of the display module EID0, An input/output IO6 of the secure element SE3 is used to manage the SCLK signal and is connected to both an input/output of the display module EID0 and an input/output of the configuration component WM of the display module EID0, and An input/output IO7 of the secure element SE3 is used to manage the signal SEL1 and is connected only to the input CSEL1 of the display module EID0, to which it provides the selection signal SEL1, 3) Bus BS3 (I2C), IOGC I/O groups:

An input/output IO8 of the secure element SE3 is used to manage the SCL signal and is connected to an input/output of the touch module TM, and An input/output IO9 of the secure element SE3 is used to manage the SDA signal and is connected to an input/output of the touch module TM, 4) Finally, the last input/output IO10 of the secure element SE3 is used to receive the interrupt signal issued by the touch module TM, designated here by the reference ITR.

Since both the configuration component WM and the display module EID0 are connected to the same bus BS2, one is active while the other is disabled, and vice versa, otherwise the secure element cannot communicate with either of them. For this purpose, the configuration component WM also includes a chip select input CSEL2 for a selection signal SEL2.

In this case, it thus appears that the secure element SE3 does not have enough inputs/outputs to produce the selection signal SEL2 for the input CSEL2 of the configuration component WM.

In an embodiment, a method is implemented to still be able to control the touch screen by means of the secure element SE3. According to this method, the selection input CSEL2 is controlled by an input/output IOM4 of the microcontroller MCU3, which provides the selection signal SEL2. This is because a microcontroller usually has available I/Os, unlike the secure element. The binary value of the signal SEL2 provided by the input/output IOM4 of the microcontroller is controlled by the secure element SE3, which sends commands to the microcontroller via the bus BS1 for this purpose. The microcontroller is configured to "slavishly" execute these commands. Preferably, it does not have any application programs that could take control of the input/output IOM4, other than the one needed to execute the commands sent by the secure element.

Figure 10:
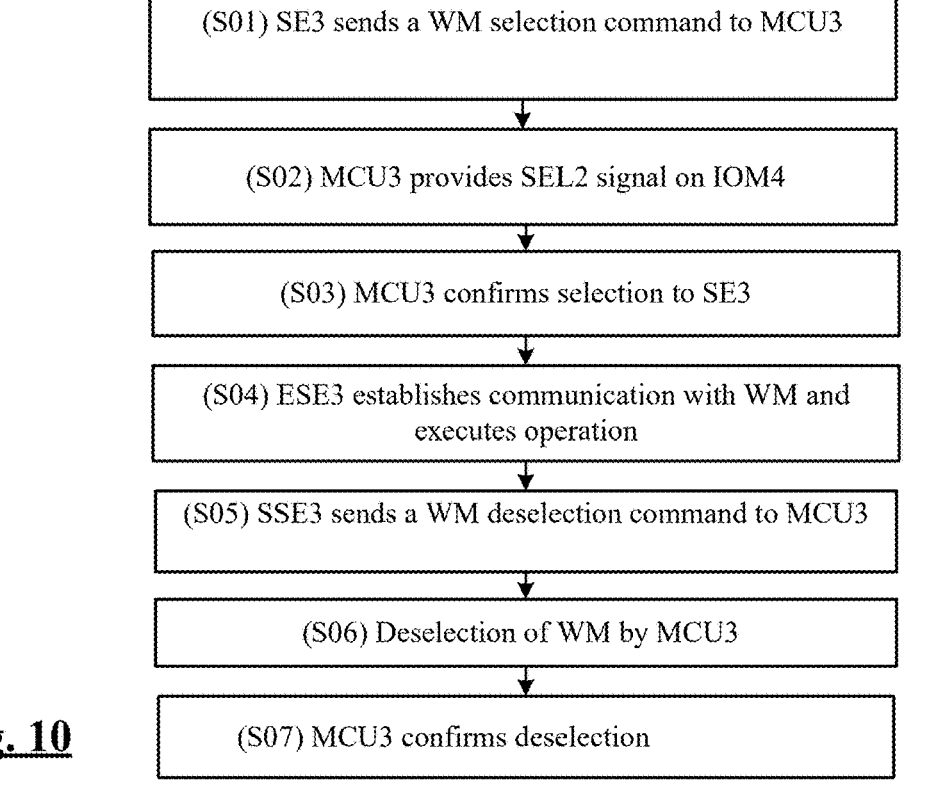

An example of a method for controlling the input CSEL2 of the configuration component WM by the secure element SE3, via the microcontroller MCU3, is described in FIG. 10.

At a step S01, the secure element SE3 sends the microcontroller MCU3 a command to select the configuration component WM. At a step S02, the microcontroller executes this command and applies the selection signal SEL2 of the configuration component to the input CSEL2 via its input/output IOM4. The value of this signal may be 0 (ground voltage) or 1 depending on the specifications provided by the manufacturer of the configuration component WM. At a step S03, the microcontroller confirms to the secure element that the configuration component has been selected. At a step S04, the secure element SE3 establishes communication with the configuration component WM by means of the bus BS2, after having previously deactivated the input CSEL1 of the display module EID0 by means of the signal SEL1. The secure element then performs the targeted operation on the configuration component, for example the deletion and/or writing of data if it is a non-volatile memory. Once the operation is complete, the secure element sends the microcontroller, at a step S05, a command to deselect the configuration component WM. At a step S06, the microcontroller deselects the configuration component WM and then confirms this deselection to the secure element at a step S07. The latter can then re-establish communication with the display module EID0 by means of the bus BS2, after having reselected it via its input CSEL1 by means of the signal SEL1.

It will become clear to the skilled person that the method just described may have various alternatives, in particular with regard to the command execution confirmations, which could be optional, and the command transfer protocol between the secure element and the microcontroller.

Also, it will become clear to the skilled person that this method may be applied to various other peripheral components. In one embodiment, the bus BS2 is connected to a third peripheral device in addition to the display module EID0 and the configuration component WM. The secure element selects/deselects this third device via another I/O of the microcontroller, and communicates with this device by means of the data bus BS2, after deselecting the display module EID0 and the configuration component.

Finally, it will become clear to the skilled person that this method may have various applications and is not limited to the control of a touch screen. It may be any circuit structure combining a microcontroller and a secure element, in which the secure element controls a greater number of peripheral components than the number of peripheral components that it could control if it were to manage all inputs or inputs/outputs of such peripheral components, including their selection inputs.

Figures 11, 12, 13, 14:
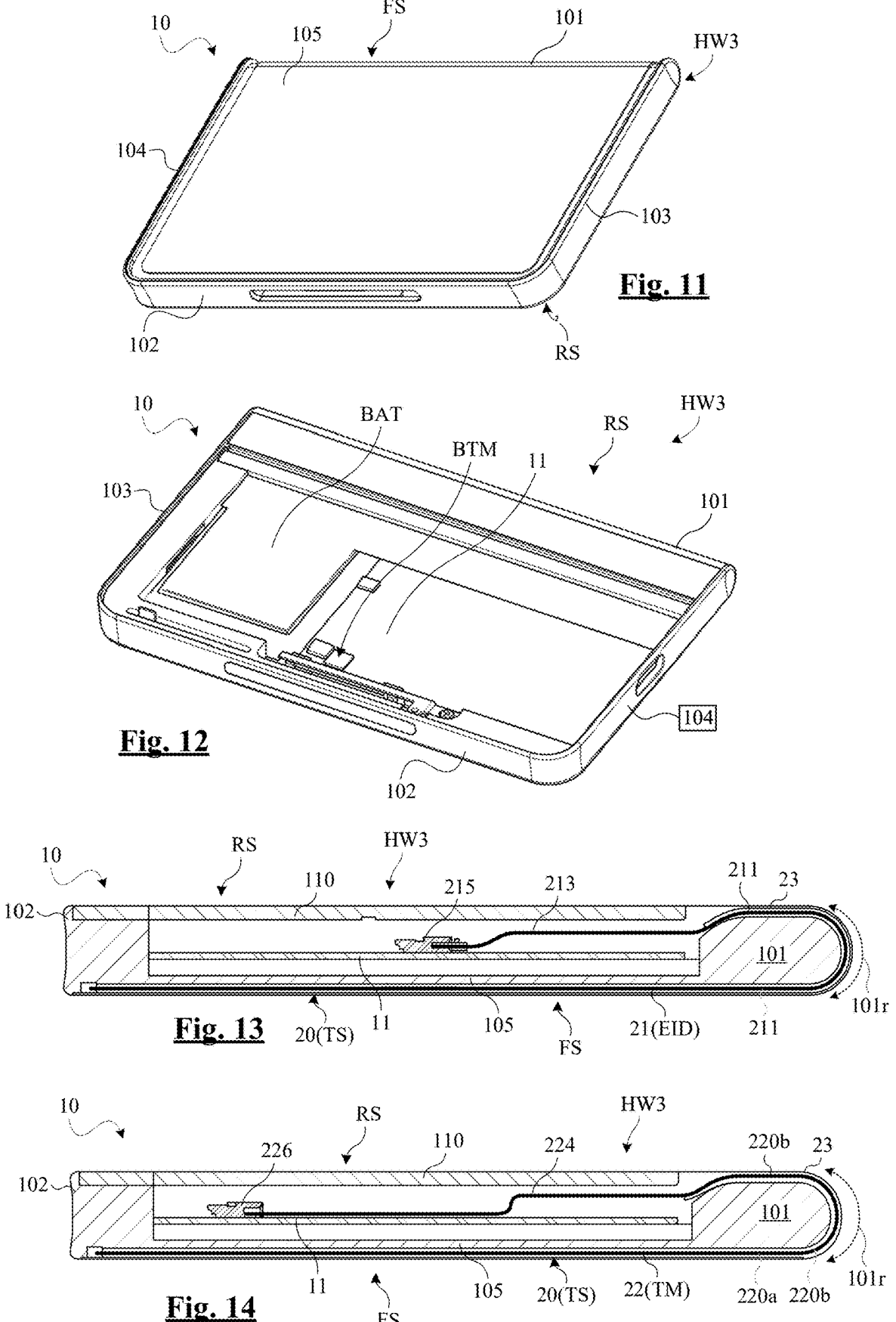
FIG. 11 is a top-down and perspective view of an embodiment of the hardware wallet of FIG. 5.
FIG. 12 is a bottom-up and perspective view of the hardware wallet of FIG. 11.
FIG. 13 is a cross-section view of the hardware wallet of FIG. 11, showing some of the building blocks.
FIG. 14 is another cross-section view of the hardware wallet of FIG. 11, showing other building blocks.

Exemplary Embodiment of a Hardware Wallet with a Large Touchscreen and a Chassis Edge Display FIGS. 11 and 12 show a chassis 10 of a hardware wallet HW3 structured in accordance with a second improvement. The chassis of the device HW3 is seen from its front side FS in FIG. 11 and from its rear side RS in FIG. 12. Chassis 10 is a one-piece, rectangular-shaped part made of machined or die-cast aluminum. It includes a first longitudinal sidewall 101, a second longitudinal sidewall 102, a first transverse sidewall 103, a second transverse sidewall 104, and a plate 105 that covers the entirety of its front side FS. Inside the chassis, the battery BAT is present with a printed circuit 11 receiving various components of the device HW3, the architecture of which has been described in relation to FIG. 5.

FIGS. 13 and 14 are cross-sections of the device HW3, with the rear side RS of the chassis facing upwards. The device HW3 includes a touch screen 20, previously designated TS, arranged on the front plate 105 of the chassis. The touch screen 20 is obtained by assembling an electronic ink display 21 (FIG. 15) previously designated EID, covered by a touch module 22 (FIG. 16) previously designated TM, itself covered by a protective layer 23 (FIG. 17).

Figure 15:
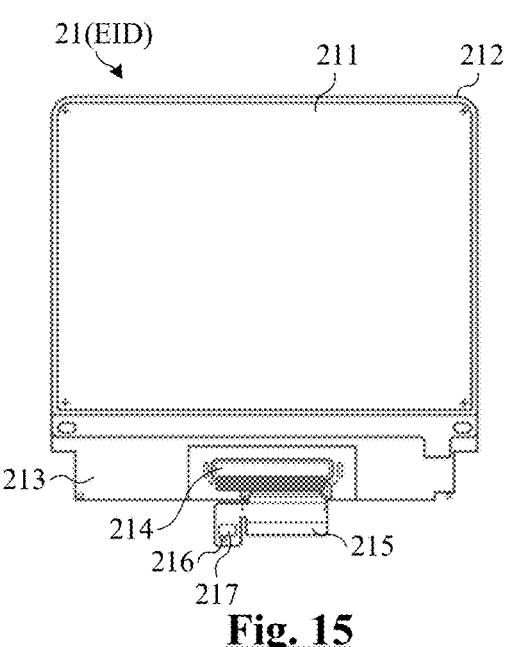
FIG. 15 is a top view of a hardware wallet display of FIG. 11.
Figure 16:
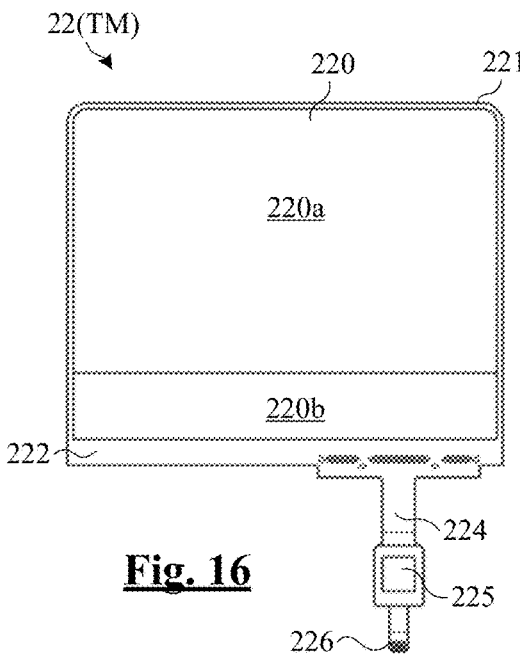
FIG. 16 is a top view of a touch module of the hardware wallet of FIG. 11.

Display 21 is shown in more detail in FIG. 15. It includes an active area or display area 211, a painted frame 212, and is manufactured on a soft 213 substrate according to COP (chip on plastic) technology. The display is for example an organic active matrix electrophoretic display combining the source drivers, gate drivers, and an IC controller bonded directly to the display substrate, e.g. the UltraChip® UC8177 controller. The display offers 670×496 pixels with a pixel pitch of 119 micrometers with 16 levels of gray. Its dimensions are for example 3.9 inches (9.906 cm) for a total length of 77.4 mm and a total width of 81.7 mm. The dimensions of the active area are, for example, 79.73×59.03 mm. The flexible substrate 213 extends beyond the active area 211, and receives a row and column multiplexer 214. It is extended by a SPI bus connector 215 made into a flexible printed circuit board, allowing the display 21 to be connected to the printed circuit board 11 in the chassis. The connector comprises auxiliary components 216 and a non-volatile memory 217 receiving a library of waveforms, corresponding for example to the configuration component WM mentioned in the embodiment of device HW3 in FIG. 9.

Touch module 22 is shown in detail in FIG. 15. It has a cover area 220 and a painted frame 221, the whole being made on a flexible printed circuit (FPC) board 222. The coverage area 220 includes a touch zone 220*a* and a non-touch zone 220*b*. The flexible board 222 has an extension 224 that receives a module control chip 225, such as the Goodix® GT1151QM chip. The end of the extension 224 receives an I2C bus connector 226 to connect the touch module 22 to the PCB 11 present in the chassis. The touch module has, for example, a total length of 65.7 mm and a total width of 81.3 mm. For example, the touch area 220*a* has a surface area of 79.73×48.10 mm and the non-touch area 220*b* extends 34.0 mm beyond it.

Figure 17:
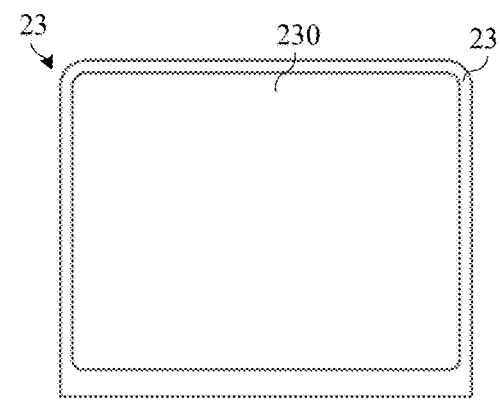
FIG. 17 is a top view of a protective layer of the hardware wallet of FIG. 11.

The protective layer 23 is shown in FIG. 17. It has a transparent area 230 and a painted frame 231. For example, the layer has a total length of 67.9 mm and a total width of 83.7 mm. It includes a moisture protection layer, an anti-reflective hard layer and an optically clear adhesive on its back side to assemble it on the touch module 22. In an embodiment, the layer is designed to be scratch-resistant in the case of stacking the device HW3 with other similar devices HW3-1, HW3-2, which will be described later (FIG. 24).

Figure 18:
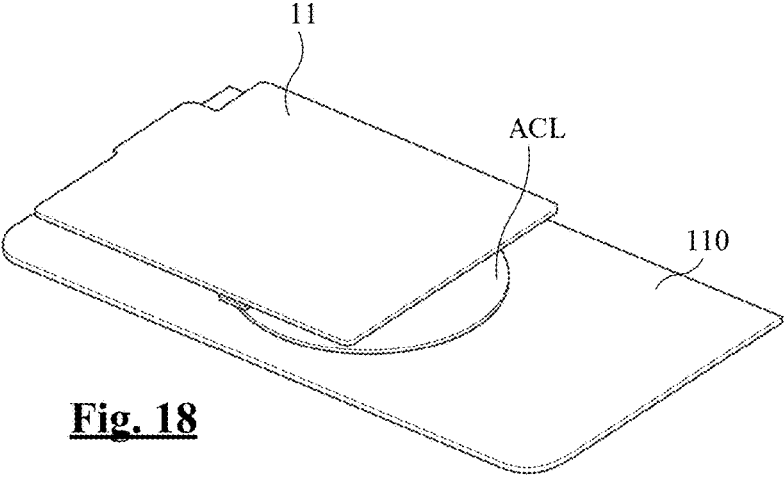
FIG. 18 shows a cover for the hardware wallet of FIG. 11.

In FIGS. 13 and 14, it appears that the longitudinal side wall 101 of the chassis has a rounded outer edge 101*r* with a roughly semicircular section, indicated by a dotted arrow. Wall 101, because of its thickness, also has a flat portion extending plate 105, which forms part of the front side FS of the chassis. It also has, after the rounded edge 101*r*, a flat portion that forms part of the rear side RS of the chassis. The rest of the rear side of the chassis is closed by a cover 110. It will be noted that, in an embodiment of the cover shown in FIG. 18, the cover 110 has an antenna coil that is connected to the circuit board 11.

According to the improvement described here, and as shown in FIG. 13, the active area 211 of the display 21 extends over:

most of the front plate 105, most of the flat part of wall 101 which extends plate 105 and forms part of the front side of the chassis, most of the rounded edge 101*r* of the wall 101, and, optionally, the flat part of wall 101 which forms part of the rear side of the chassis.

The flexible substrate 213 that extends beyond the active area 211 penetrates the chassis to allow the SPI bus connector 215 to be attached to the PCB 11, this part of the circuit being hidden by the cover 110.

Similarly, in FIG. 14, the touch module 22, which covers the display 21 and is itself covered by the layer 23, extends over:

most of the front plate 105, most of the flat part of wall 101 which extends plate 105 and forms part of the front side of the chassis, most of the rounded edge 101*r* of the wall 101, and, optionally, the flat part of wall 101 which forms part of the rear side of the chassis.

The terminology "most of" refers to at least 90% of the area concerned, for example.

The extension 224 of the touch module then passes under the cover 110 and penetrates the chassis to allow the I2C bus connector 226 to be attached to the PCB 11.

Preferably, the touch area 220*a* of module 22 covers only the front plate 105 and the flat part of the wall 101 that extends the plate 105 and forms part of the front side of the chassis, while its non-touch area 220*b* covers the rounded edge 101*r* and the flat part of the wall 101 that forms part of the rear side of the chassis.

Thus, the touch screen TS enables the secure element to:

display information on the front side of the chassis, and collect tactile information, display information on the rounded edge 101*r* without the risk of collecting unintentional tactile information due to the handling of the chassis by the user.

The device HW3, while meeting the rigorous security requirements required by its functionality as a hardware wallet, offers remarkable ergonomic advantages usually reserved to moderately secure devices whose screen is not controlled by a secure element, operating on Android or equivalent, with the additional possibility of displaying specific information on the edge of the chassis.

Exemplary Embodiment of a Hardware Wallet Including Magnetic Stacking Means

As noted above, some crypto asset holders may use multiple hardware wallets to manage crypto asset accounts of different types or values, such as low monetary value accounts, high monetary value accounts, non-fungible token or smart contract accounts, etc.

A third improvement, which may or not be combined with the previous improvements, provides for a hardware wallet that can be magnetically stacked with similar hardware wallets.

More specifically, a hardware wallet is provided comprising at least four magnets arranged in such a way as to cooperate magnetically with four magnets from at least one similar hardware wallet, in order to ensure the magnetic stacking of the hardware wallet with the similar hardware wallet, regardless of which hardware wallet is on top of the other.

In an embodiment, the magnets are arranged asymmetrically to form a magnetic keying for a stacking in which the edges of the chassis of the hardware wallet are aligned with the same edges of the similar hardware wallet, and in which each magnet faces the corresponding magnet of the similar device.

Figure 19:
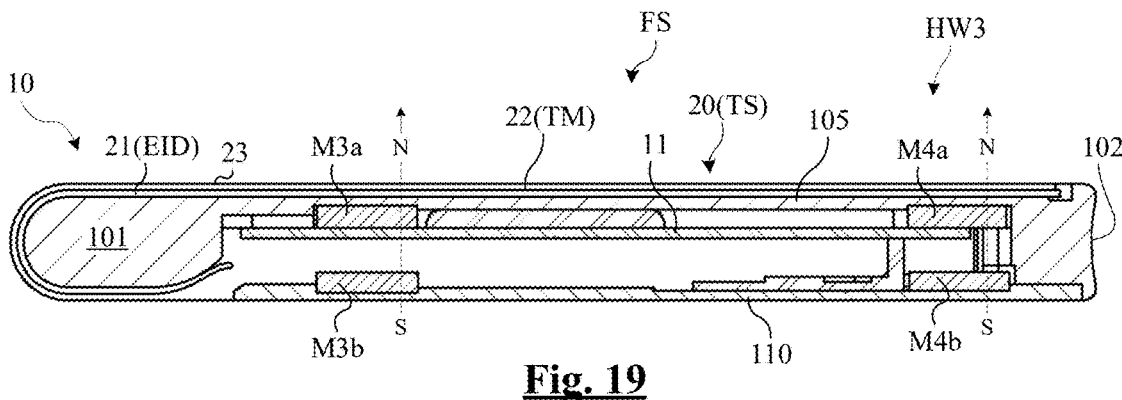
FIG. 19 is a cross-section view of a magnetically stackable hardware wallet including magnets.
Figure 20:
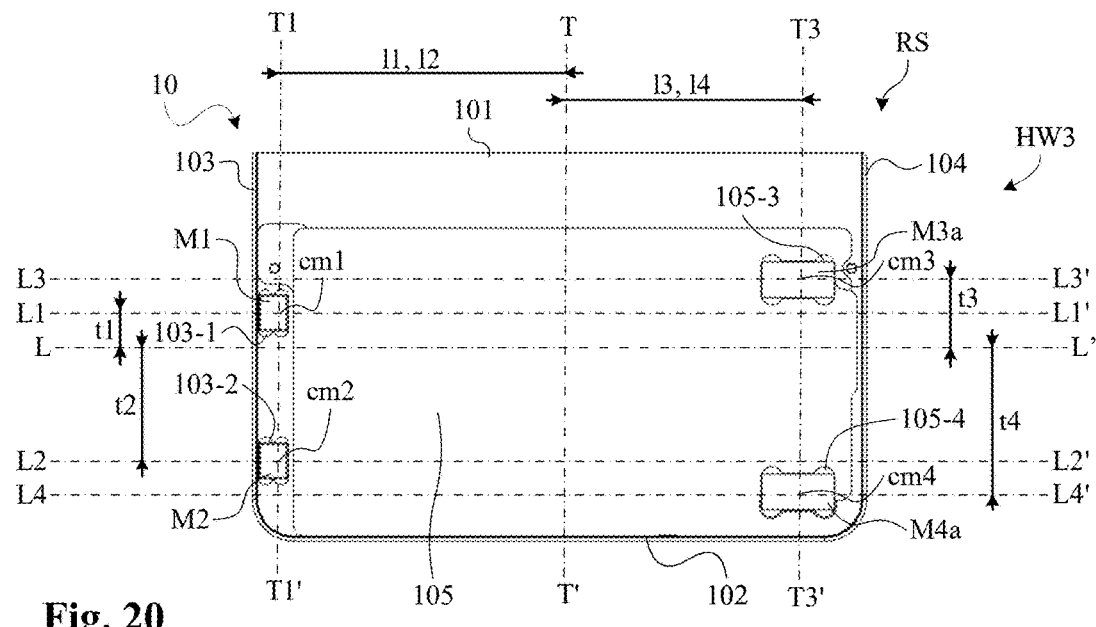
FIG. 20 is a bottom view of the hardware wallet of FIG. 19.
Figure 21:
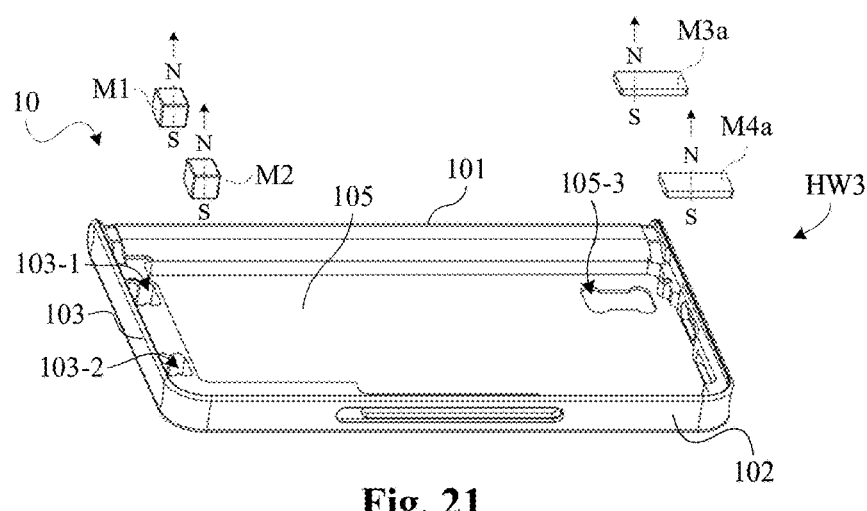
FIG. 21 is an exploded view from below of the hardware wallet of FIG. 19.

FIGS. 19, 20, 21 show a device HW3 according to this embodiment.

FIG. 19 is a cross-sectional view, FIG. 20 is a top view, and FIG. 21 is an exploded perspective view of the device HW3. In FIG. 19, the front side FS of chassis 10 is at the top. In FIGS. 20 and 21, the chassis is seen from its rear side RS.

Chassis 10 is fitted with four magnets M1, M2, M3 and M4 preferably with the same magnetic orientation, e.g. the North facing the front of the chassis. The magnets M1 and M2 are arranged in slots 103-1, 103-2 made in the transverse side wall 103 of the chassis, which extend through approximately the entire thickness of the chassis. The magnets M1 and M2 therefore generate a magnetic field on both sides of the chassis.

The magnets M3, M4 each include two superimposed magnets M3*a*-M3*b*, and M4*a*-M4*b*, as shown in FIG. 19. The magnets M3*a* and M4*a* are arranged in slots 105-3, 105-4 provided in the front plate 105 of the chassis (FIGS. 20, 21), while the magnets M3*b*, M4*b* are attached on the cover 110, opposite the slots 105-3, 105-4, in recesses provided for this purpose in the cover. The magnets M3*a* and M3*b*, M4*a* and M4*b* extend through less than half of the thickness of the chassis, and the space between them advantageously allows the passage of the printed circuit board 11, as can be seen in FIG. 19.

In the following, the magnets M3 and M4 will be considered as being of one piece, like the magnets M1 and M2, as their structure in two superimposed magnets does not modify the reasoning presented below.

The arrangement of the magnets M1, M2, M3, M4 is chosen here to form a magnetic keying during the magnetic stacking of the device HW3 with a similar device HW3-1, as shown schematically in FIG. 24. The intended stacking arrangement is an arrangement in which the edges of the chassis of device HW3 are aligned with the same edges of the device HW3-1, and in which each magnet of the device HW3 faces the corresponding magnet of the similar device HW3-1. This arrangement should preferably be unique, so that there is only one magnetic stacking position in which the devices HW3, HW3-1 have their respective edges aligned. In other words, when the stacking arrangements are not identical (e.g. if the devices are arranged head to toe), the devices do not adhere magnetically. The arrangement of the magnets therefore prevents the devices from being mispositioned, so that the devices do not magnetically attract each other in this case.

For this purpose, and with reference to FIGS. 20 and 22, a longitudinal central axis L-L' of the chassis is defined, located halfway between the longitudinal lateral edges 101, 102 of the chassis, and a transverse central axis T-T' of the chassis is defined, located halfway between the transverse lateral edges 103 and 104 of the chassis. The axes L-L' and T-T' define four quadrants Q1, Q2, Q3, Q4 and each magnet is arranged in one of these quadrants. The magnets M1, M2, M3, M4 are arranged asymmetrically with respect to the longitudinal central axis L-L' or with respect to the transverse central axis T-T'. A combination of these two asymmetries may also be provided for all or part of the magnets. To formalize this asymmetry more precisely, each magnet M1, M2, M3, M4 is defined as having a central point cm1, cm2, cm3, cm4 (cmi), a longitudinal dimension lm1, lm2, lm3, lm4 (lmi) and a transverse dimension tm1, tm2, tm3, tm4 (tmi), as shown in FIG. 23.

In addition, the following axes and distances are defined, as shown in FIGS. 20 and 22:

L1-L1' is a longitudinal axis crossing a central point of the magnet M1 and parallel to the longitudinal central axis L-L', t1 is the transverse distance between the axes L1-L1' and L-L', L2-L2' is a longitudinal axis crossing a central point of the magnet M2 and parallel to the longitudinal central axis L-L', t2 is the transverse distance between the axes L2-L2' and L-L', L3-L3' is a longitudinal axis crossing a central point of the magnet M3 and parallel to the longitudinal central axis L-L', t3 is the transverse distance between the axes L3-L3' and L-L', L4-L4' is a longitudinal axis crossing a central point of the magnet M4 and parallel to the longitudinal central axis L-L', t4 is the transverse distance between the axes L4-L4' and L-L', T1-T1' is a transverse axis crossing a central point of the magnet M1 and parallel to the transverse central axis T-T', l1 is the longitudinal distance between the axes T1-T1' and T-T', T2-T2' is a transverse axis crossing a central point of the magnet M2 and parallel to the transverse central axis T-T', l2 is the longitudinal distance between the axes T2-T2' and T-T', T3-T3' is a transverse axis crossing a central point of the magnet M3 and parallel to the transverse central axis T-T', l3 is the longitudinal distance between the axes T3-T3' and T-T', T4-T4' is a transverse axis crossing a central point of the magnet M4 and parallel to the transverse central axis T-T', and l4 is the longitudinal distance between the axes T4-T4' and T-T', It may be provided in one embodiment that at least two magnets have different transverse distances t1-t4 or longitudinal distances l1-l4.

In an embodiment, one of the following design rules or a combination of two or more of these rules is implemented:

the transverse distances t1-t4 are all different from each other, the longitudinal distances l1-l4 are all different from each other, some transverse distances t1-t4 are different and some longitudinal distances l1-l4 are different.

In another, even more rigorously asymmetrical embodiment, one of the following rules is added to one of the above rules or to a combination of these rules:

the difference between each transverse distance t1, t2, t3, t4 and each of the other transverse distances is at least equal to the sum of the halves of the transverse dimensions tm1, tm2, tm3, tm4 of the corresponding magnets, or the difference between each longitudinal distance l1, l2, l3, l4 and each of the other longitudinal distances is at least equal to the sum of the halves of the longitudinal dimensions lm1, lm2, lm3, lm4 of the corresponding magnets, Or, by combining the two rules:

the difference between certain transverse distances T1, T2, T3, T4 is at least equal to the sum of the halves of the transverse dimensions tm1, tm2, tm3, tm4 of the corresponding magnets, and the difference between certain longitudinal distances L1, L2, L3, L4 is at least equal to the sum of the halves of the longitudinal dimensions lm1, lm2, lm3, lm4 of the corresponding magnets.

In the embodiment shown in FIG. 20, the center cm2 of the magnet M2 is arranged on the transverse axis T1-T1' of the magnet M1, and the center cm4 of the magnet M4 (M4*a*, M4*b*) is arranged on the transverse axis T3-T3' of the magnet M3 (M3*a*, M3*b*). The longitudinal distances l1, l2 are equal, as well as the longitudinal distances l3, l4, but the longitudinal distances l1, l2 are different from the longitudinal distances l3, l4. Moreover, the transverse distances t1, t2, t3, t4 are all different, and the smallest deviations between the transverse distances, here the differences between the distances t1 and t3 and between the distances t2 and t4, are approximately equal to the sum of the halves of the transverse dimensions of the corresponding magnets, i.e. M1, M3 on the one hand and M2, M4 on the other hand. The term "approximately" is understood here to within a few tenths of a millimeter.

It will become clear to the skilled person that the improvement just described may have various other variants and embodiments. In particular, the magnets M1 and M2 may themselves comprise two superimposed magnets, as illustrated in FIG. 25 which shows a variant HW4 of the device fitted with a magnet M1 formed by a pair of magnets M1*a*, M1*b*. Conversely, the magnets M3 and M4 may be of one piece and extend through the entire thickness of the chassis, as illustrated in FIG. 26 which shows a variant HW5 of the device equipped with a one-piece magnet M3 identical to the magnet M1. Similarly, the attachment of the magnets to the chassis may be achieved in a variety of ways other than those described. In particular, the magnets or some of them could be directly attached to the printed circuit board, if the latter is robust enough to withstand the breakout force that is exerted on each magnet when separating two magnetically stacked devices. Finally, although this improvement does not require it, the polarities of the magnets may, in some embodiments, not all be identical. It will also become clear to the skilled person that the improvement just described may be applied to any type of portable electronic device that is to be stacked with a similar device.

Exemplary Embodiment of Handheld Electronic Devices with Interactive Stacking Functionality Examples of devices that can be magnetically stacked in accordance with the third improvement have been described above. According to a fourth improvement, stacked devices implement an interactive stacking management method that allows them to be used when they are present in a stack despite the fact that their front-side screen is no longer accessible.

Figure 27:
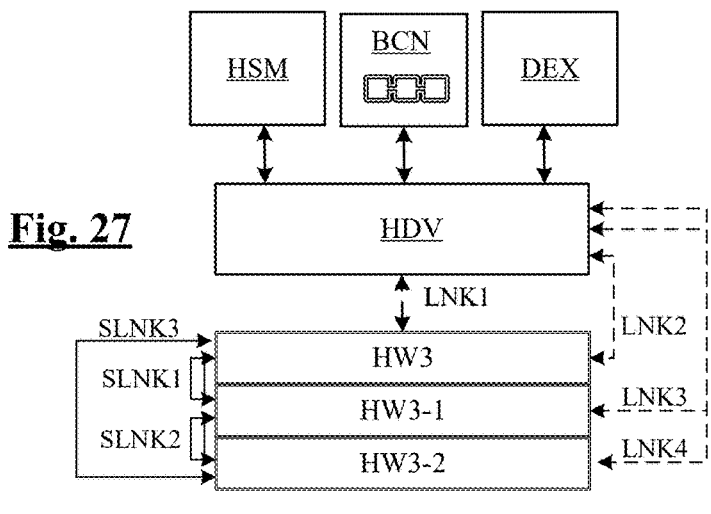
FIG. 27 shows a magnetic stack of hardware wallets.

For example, a user might own three hardware wallets HW3, HW3-1, HW3-2 and magnetically stack them as shown in FIG. 27. The user may want to access their contents or check their status (battery charge, crypto-asset wallets, value of a private key, etc.) without undoing the stack. The user may also want to use one of the devices by linking it to a host device HDV to complete a transaction on the blockchain BCN or a decentralized exchange DEX, or to update or download an application program via a module HSM.

According to this embodiment, the device at the top of the stack makes its display available to other devices when the user requests it. The terminology "making available" means that the user can use the screen of the device at the top of the stack to view or use a device inside the stack.

For this purpose, the devices communicate with each other by means of a wireless data link. In the case of a device HW3 as described above, this link is for example a multipoint Bluetooth link, after pairing the devices, as well as, preferably, pairing the devices with a host device HDV.

The organization of data exchanges between stacked devices may be done according to a meshed, chained, or hierarchical communication strategy. In a mesh communication strategy, each device can communicate with any of the other devices. In the example shown in FIG. 27, such a strategy involves wireless data links SLNK1, SLNK2, SLNK3 between the devices. In a chained communication strategy, each device can communicate with the device immediately below or above it in the stack. In the example shown in FIG. 27, such a strategy involves the wireless data links SLNK1 and SLNK2. In a hierarchical communication strategy, the device at the top of the stack communicates with the devices below it, and two devices inside the stack do not communicate with each other. In this case, only links SLNK1 and SLNK3 are used in the example in FIG. 27.

As this improvement is applicable to any type of electronic handheld device including wireless means of communication, in particular Wi-Fi, the choice of a communication strategy may vary depending on the type of wireless data link used. A hierarchical communication strategy may be preferred, for example, in the case of Bluetooth links. A mesh communication strategy may be preferred in the case of Wi-Fi links.

In an embodiment, the interactive stacking method according to this improvement assigns each device in the stack one of the following modes of operation:

a mode SM0, or "Stack Mode Disabled",
a mode SM1, or "Covered" mode,
a mode SM2, or "Top" mode,
a mode SM3, or "Middle" mode.

In modes SM1, SM2 and SM3, the stack mode is enabled, and each mode translates the position of the device in the stack and corresponds to specified displays "F" and "E":

| Mode | Stack Mode | Location | Display |
|------|------------|----------|---------|
| SM0 | Disabled | Isolated | F0, E0 |
| SM1 | Enabled | Bottom of stack | F1, E1 |
| SM2 | Enabled | Top of stack | F2, E2 |
| SM3 | Enabled | Between two devices | F3, E3 |

In order to make the best use of the display possibilities offered by the touchscreen TS described above, each mode is assigned an "F" display on the front side ("front display") and an "E" display on the edge of the device ("Edge" display). The "E" display corresponds, in the embodiment described above, to information display on the non-touch area of the touchscreen TS over the rounded edge 101*r* of the chassis. An "F" display can correspond to one or more different menus, allowing to manage the stack or manage individually one of the devices that make up the stack.

The operating mode SM0 corresponds to the normal operating mode of the device HW3. The device HW3 in mode SM1 or SM3 is covered by another device and therefore wouldn't be usable without the method described herein. The device in mode SM2 is at the top of the stack and can be used normally since its screen is accessible to the user, but it can also make its screen available to other devices upon request by the user. The provision of operating mode SM3 may not be required, depending on the interactive management needs of the stack. In particular, it may not be necessary to know which devices are at the bottom or middle of the stack while the device in "top" mode addresses each of them.

The display F0 is the usual display presented to the user when using the device with the stack mode disabled. The display F1 ("covered") or F3 ("In-between") may be arbitrary since the user does not see the device's screen. The display may be blank or show an image or information, for example "this device is in stack mode". But it may also display instructions, for example "disable stack mode", which can be useful if the user breaks the stack without first informing the device at the top of the stack that the stack mode should be disabled, which information the device will transmit to the other devices.

Figure 28:
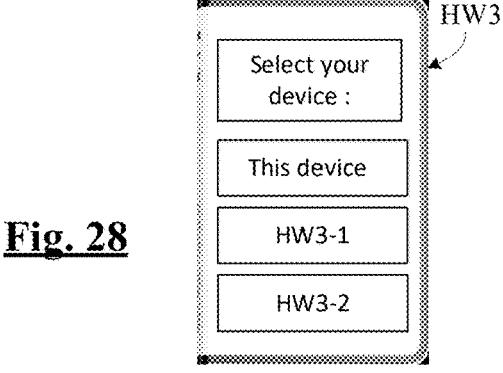
FIG. 28 shows an example of a menu displayed by a hardware wallet stacked with other hardware wallets, FIG. 29 describes operations executed by a hardware wallet stacked with other hardware wallets.

The display F2 may include a pre-display of a menu by which the user selects the device they wish to control by means of the screen. An example of such a menu is shown in FIG. 28. The user is prompted to choose between "this device" or one of the other two devices HW3-1, HW3-2. If the user chooses "this device", the display F2 switches to a display F0', which is similar to the display F0, with the addition of a "back" button to allow the user to make a new choice. If the user chooses "HW3-1" or "HW3-2", the display F2 switches to a display F0", which is similar to the display F0, but with the additional indication that the device in use is not "this device", but the one that has been selected. A back button is also provided to allow the user to make a new choice.

Thus, using a device located inside the stack through the screen of the device at the top of the stack may be similar to using it when stack mode is disabled, with either the display F0' or F0" including the same menus as the display F0. For example, the user may choose to connect the device to a host device HDV using a data link LNK1, LNK2, or LNK3, to conduct a transaction, as shown in FIG. 27.

The edge displays E0 to E4 are optional but may provide additional comfort to the user since they are visible despite the fact that the devices are stacked. These displays may be the same or different. For example, they may display the name of the device or its serial number. When a device in mode SM1 or SM3 is selected by the device in mode SM2, the display of the device name or serial number may flash or scroll instead of remaining stationary.

Figure 29:
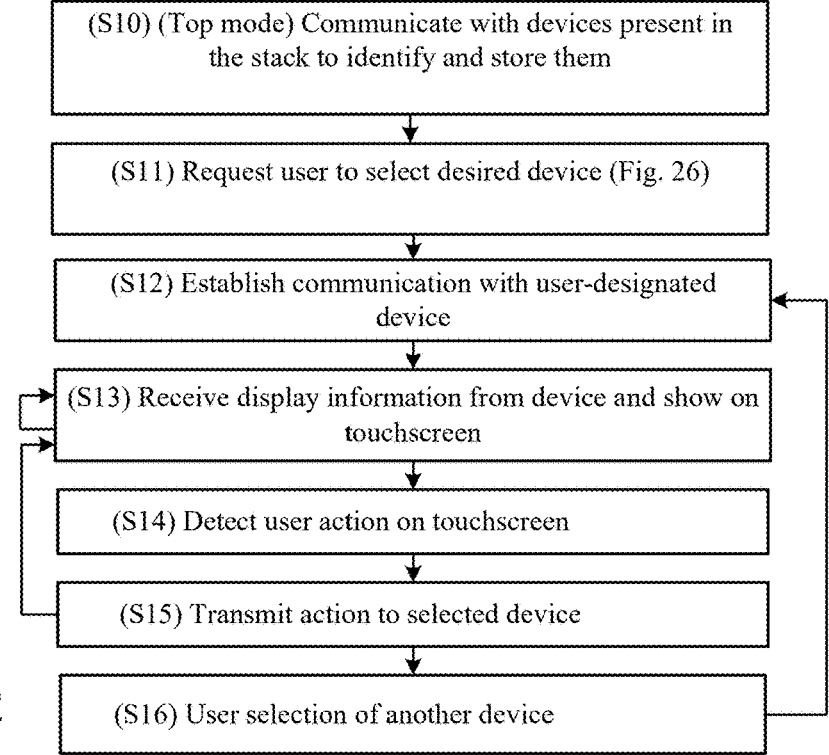

FIG. 29 depicts operations carried out by the device HW3 after being placed in the "top" mode SM2 (FIG. 27). At a step S10, the device HW3 interrogates all devices in the stack to identify them. It will be noted that for security reasons, the implementation of these various data links preferably requires prior device configuration steps during which each device is informed of the devices with which it may be stacked. A device that has not been previously declared by the user will therefore not be allowed in a stack. Similarly, devices HW3, HW3-1, HW3-2 may be expected to securely authenticate each other using their cryptographic means, before agreeing to communicate with each other.

At a step S11, the device HW3 presents the list of devices to the user and asks them to make a choice, for example in the aforementioned way shown in FIG. 28. At a step S12, the device HW3 establishes communication or re-establishes communication with the user-designated device. At a step S13, the device HW3 receives information from the selected device to be displayed and displays it on its touch screen. At a step S14 the device HW3 detects a user action on its touch screen and transmits it, at a step S15, to the selected device. This process may continue indefinitely as long as the user is using the selected device, up to a step S16 where the user returns to the choice menu (FIG. 28) to select another device or to request that all devices be put into sleep mode.

The implementation of this interactive stack management process assumes that each device is able to activate the stack mode and knows where it is in the stack, to place itself in the corresponding mode SM1 or SM2, or optionally in the mode SM3. For this purpose, the stack management method may be implemented automatically or manually.

As part of an automatic implementation of the method, each device HW3, HW3-1, HW3-2 is fitted with sensors 108*a*, 108*b*, as shown in FIG. 30. These sensors allow devices to detect the presence of another device below or above them. If the devices are fitted with magnets, the sensors 108*a*, 108*b* may be Hall effect sensors, capable of detecting the presence of a magnet below or above each device. The sensors 108*a*, 108*b* may be directly connected to the secure element SE3 as shown in FIG. 5 or be connected to the microcontroller MCU3. A variety of other types of sensors may be used, such as optical, acoustic, piezoelectric, electromagnetic, thermal, capacitive sensors, etc., especially if the stacked devices do not have magnets.

In an embodiment, it is not essential that the sensors allow identifying with certainty that an object detected on or under a device HW3, HW3-1, HW3-2 is a similar device suitable for placement in the stack mode. This uncertainty may be removed by the device in the "top" mode according to the replies received to its requests for identification. Similarly, a device that detects an object placed above it and does not receive any identification request will understand that the object is not a compatible device.

FIG. 31 is a state diagram showing an example of an automatic implementation of the interactive stack management method. In this example, the four operating modes SM0, SM1, SM2, SM3 are managed. The device HW3 is in mode SM0 by default. At a step S22, the device detects the presence of a device above it and switches to mode SM1, where it waits to be queried by the device in the "top" mode. As an alternative, the device detects the presence of a device below it at a step S23 and switches to "top" mode to query and identify other devices in the stack. If the device is in mode SM2 and detects at a step S24 that a device has been placed on top of it, it switches to mode SM3. Once in mode SM3, the device reverts to mode SM2 if, at a step S25, the device above it is no longer detected. Finally, regardless of which mode SM1, SM2, SM3 it is in, if the device detects at a step S20 that there are no more devices above or below it, it automatically returns to mode SM0.

In a manual implementation of the method, the user accesses a menu for manually activating the stack mode, an example of which is shown in FIG. 32. The user first activates the stack mode, then chooses between the "covered" mode SM1 and the "top" mode SM2. In this example, mode SM3 is not supported.

Figure 33:
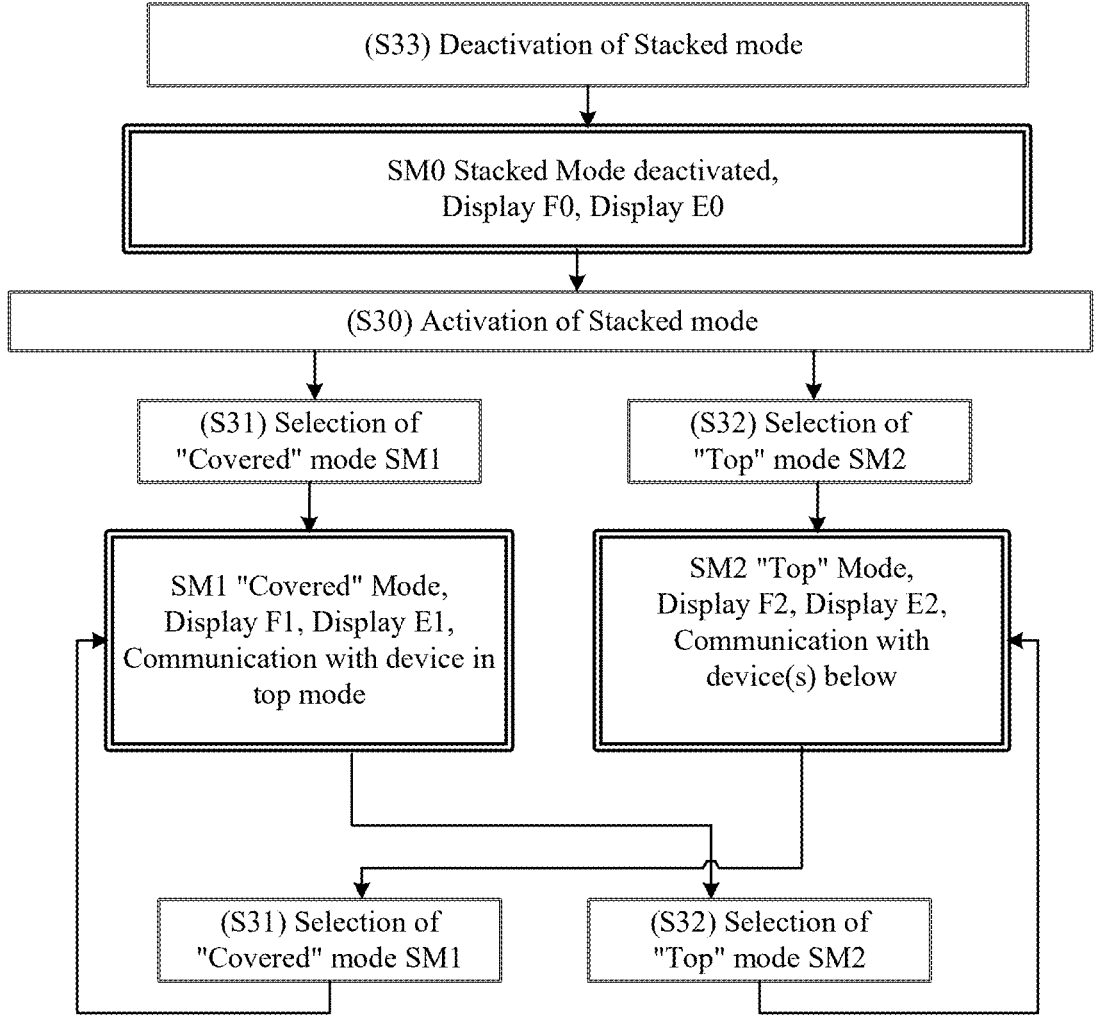

FIG. 33 is a state diagram showing an example of manual implementation of the interactive stack management method. The device HW3 is in mode SM0 by default. At a step S30, the user activates the stack mode. At a step S31, the user chooses the mode SM1 or chooses the mode SM2 at a step S32. At any time, the user can return to step S31 or S32 to change the device's operating mode while changing its position in the stack. Similarly, the user can deactivate the stack mode at any time at a step S33.

In an application of the method to hardware wallets of the type described above, the modes SM0, SM1, SM2, and optionally SM3 are preferably managed by the operating system OS3 of the secure element SE3. For this purpose, a module for automatic stack management ASM is provided in the operating system, as shown in FIG. 6. Alternatively, the operating system OS3 provides a module MSM for manual stack management. In some embodiments, the two modules may coexist, with the user being offered the choice between automatic or manual management. Each of these modules allows the device to be placed in the different modes of operation and to operate according to what these modes require. When operating mode SM3 is not supported, it is included in mode SM1, which supports the case where the device is at the bottom of the stack and the case where it is in the middle of the stack.

It will become clear to the skilled person that the method according to the present improvement is applicable to any type of portable electronic device comprising means of wireless communication, in particular Wi-Fi, and that its scope is not limited to hardware wallets for the cold storage of private keys. Similarly, the method is not exclusively related to the use of magnets to stack the devices, as a stacking can be provided without the devices being held magnetically against each other. Also, the method is applicable to devices that do not have a display at the edge of the chassis (display E) and have only a display on the front side (display F).

In some embodiments, the interactive stack management method can also involve the host device HDV. In this case, the companion software menu has a "stack management" option that allows the user to select the hardware wallet they want to use to make a transaction (FIG. 27). The hardware wallet at the top of the stack is then informed by the companion software that it should make its screen available to the selected hardware wallet through the host device.

Exemplary embodiment of a self-adaptive Bluetooth antenna with two radiation axes, especially for a stackable device In the above, a hardware wallet has been described fitted with a Bluetooth antenna BTA (FIG. 5) and a touchscreen TS. A hardware wallet made of an aluminum chassis and comprising a front panel covered with an electrically conductive wall 105 receiving the touchscreen TS (FIG. 9) has also been described. Finally, a hardware wallet that can be magnetically stacked with a similar hardware wallet (FIG. 27) and a method for interactively managing a stack of hardware wallets through wireless communication between the stacked hardware wallets, in particular via Bluetooth links, has also been described.

Tests carried out by the applicant with commercially available Bluetooth antennas in the form of integrated components have shown that this type of component is unsuitable for obtaining good quality Bluetooth communication because of the metal mass of chassis 10, in particular the electrically conductive wall 105 which covers the front of the chassis (FIG. 9). In normal use (device HW3 in the open air), this metal mass causes a strong attenuation of the gain of these conventional antennas, by acting as a screen (in the sense of shielding) with regard to the electromagnetic field they emit. The gain is low, which does not allow a stable Bluetooth connection to be established.

The applicant also conducted tests with an IFA antenna ("Inverted-F Antenna"), a type of antenna generally used in mobile phones, wherein the antenna is placed close to the edges of the chassis. A relatively small gain, yet allowing Bluetooth communication, was obtained in normal use (device HW3 not stacked and in the open air). On the other hand, when two devices HW3 and HW3-1 are stacked (e.g. FIG. 30), the device at the top of the stack will see its antenna gain weaken, which can lead to unstable Bluetooth communication.

It might therefore be desirable to provide an advanced radio frequency antenna structure that is usable, but not exclusively, in a portable electronic device comprising an electrically conductive chassis, and that offers relatively stable performance under two conditions of use, including, on the one hand, use in the open air, and on the other hand, use in the presence of an electrically conductive surface, for example, when the device is stacked with a similar device.

According to a fifth improvement, a radio frequency antenna is provided comprising the combination of a closed-slot antenna made in a side wall of the chassis, having a radiation axis substantially perpendicular to this wall, and an open-slot parasitic antenna having a radiation axis perpendicular to the radiation axis of the closed-slot antenna. The two antennas are configured—i.e. adjusted—using radiofrequency field simulation computer tools considering the two above-mentioned operating conditions. The result is an antenna whose performance is more or less homogeneous under these two operating conditions. A detailed non-limiting example of the construction of such an antenna will be described in the following.

Exemplary Embodiment of a Closed-Slot Antenna

The main components of a closed-slot antenna embodiment are shown in the exploded view in FIG. 34. The structure of the antenna after assembly is shown in FIGS. 38, 39, 42, 43. In FIGS. 34, 39, 42, 43 chassis 10 is seen in perspective from its rear side RS, plate 105 being at the bottom. In the cross-sectional view of FIG. 38, plate 105 is at the top. As a result, the locations or orientations of the components are reversed in FIG. 38 compared to the other figures.

With reference to FIG. 34, the closed-slot antenna comprises a longitudinal port 40 made in one wall of the chassis, in this case the longitudinal sidewall 102. The antenna also includes a radio frequency signal injector 50, to apply a ground voltage and a radio frequency signal RFS to the port 40, this signal being provided by the circuit BTM (FIG. 5) arranged on the circuit board (FIG. 12).

The longitudinal port 40, seen from the front in FIG. 35, comprises two longitudinal surfaces 41, 42 facing each other, connected by two lateral surfaces 44, 45, here of substantially rounded shape. It has a length Ls, also the length of longitudinal surfaces 41, 42, and a height Hs. Wall 102 also has a non-traversing recess 45 which is not considered to be included in port 40.

The injector 50 is made from a flexible printed circuit board and has two electrodes 51, 52. Electrode 51 rests on surface 41 of port 40 and electrode 52 rests on surface 42 of the port. Injector 50 also includes a connecting part 53 extending between electrodes 51, 52, and an extension 54 prolonging electrode 51.

FIGS. 36 and 37 show the injector 50 respectively from a top view and a bottom view. The top view shows the outer face of the injector, which is in contact with surfaces 41, 42. Before it is folded, which occurs when it is inserted into the port 40, the injector is a flat part as seen in these figures. The injector includes various conductors 500, some of which are on the surface and some of which are buried. It also includes contact pads Pc1, Pc2, Pc3, Pc4, Pc5, Pc6 for soldering components, in this case capacitors C1, C2, C3, which participate in the closed-slot antenna configuration. Finally, the injector 50 includes a connector 540 arranged on the extension 54, allowing it to be connected to the printed circuit board to receive the ground voltage and the radio signal RFS.

When injector 50 is inserted in port 40, a compression part 55—or spacer—is inserted between electrodes 51, 52, as can be seen for example in FIG. 38. The compression part 55 is made of a soft material such as silicone rubber, and presses the electrodes 51, 52 against the surfaces 41, 42. It will be noted that electrodes 51, 52 here cover only the edges of surfaces 41, 42, the outer portion of port 40 being obstructed by a non-electrically conductive plug 47 (FIG. 38). Electrodes 51, 52 may be coated with a layer of gold 520 to ensure good electrical contact with surfaces 41, 42. These surfaces may also be made by milling to offer good electrical conductivity, especially if the aluminum frame has been anodized beforehand.

Advantageously, electrodes 51, 52 here have a large contact surface with surfaces 41, 42, the length of the contact surface being at least equal to a quarter of the length Ls of surfaces 41, 42. They are preferably inserted in the middle of the port 40, so that their edges are at the same distance from the walls 44 and 45 of the port.

FIG. 40 is an electrical diagram of the injector. Connector 540 has a plurality of ground contacts 541 connected to electrode 51 which forms a ground plane (GND). It also features a contact 542 receiving the radio frequency signal RFS. The contact 542 is connected to the pad Pc3' by a conductor 500. The capacitor C3 has a first terminal connected to the pad Pc3' and a second terminal connected to the pad Pc3 that is connected in turn to the electrode 51. The capacitor C1 has a first terminal connected to the pad Pc1' and a second terminal connected to the pad Pc1. The capacitor C2 has a first terminal connected to the pad Pc2' and a second terminal connected to the pad Pc2, which is connected in turn to electrode 51. The conductors 500 connect the pad Pc1 to the pad Pc3', the pad Pc1' to the pad Pc2' as well as the electrode 520. As shown in FIG. 41, surface 42 receives the radio frequency signal RFS via the capacitor C3, the second terminal of which is connected to surface 41 via the capacitor C3. Surface 41 is at the ground voltage and is connected to surface 42 via the capacitor C2.

The configuration just described is only exemplary in nature and various other arrangements of components and choices of components participating in the configuration of the antenna may be provided by the person skilled in the art.

Exemplary Embodiment of an Open-Slot Parasitic Antenna

Figures 42, 43, 44:
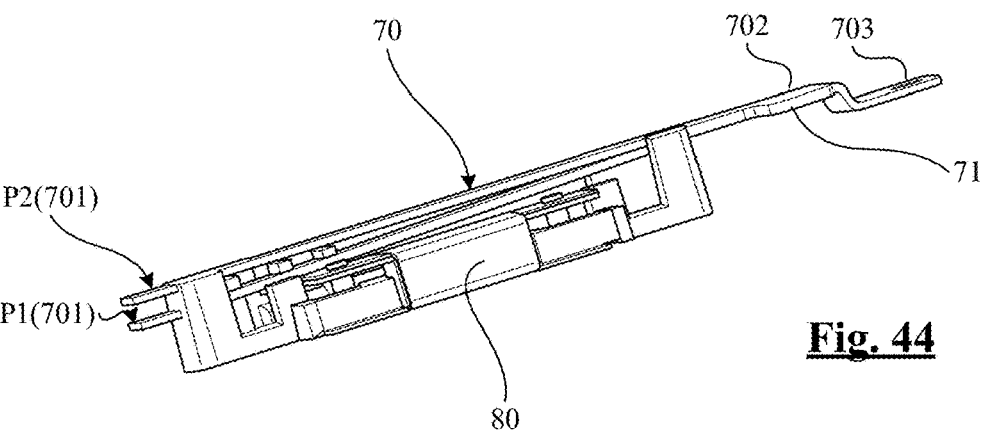
FIG. 44 shows an antenna element present in FIGS. 42, 43.

The main components of an example of an open-slot parasitic antenna are shown in the exploded view of FIG. 34. The structure of the antenna after assembly is shown in FIGS. 42, 43. The open-slot parasitic antenna has an arm 70 made of electrically conductive metal, e.g. stainless steel or mild steel with nickel plating. The arm 70 has a rectangular section of low thickness to make it flexible, and a length Lb. It extends along wall 102 of the chassis, at a distance Db from the port 40 (FIG. 38), i.e. at a distance Db from the inner edges of surfaces 41, 42 of the port 40, in a plane parallel to the plane of the surface 42 (FIG. 38) and close to it.

The 70 arm has a free end 701 and a captive end 702. The end 702 is wider than the rest of the arm and extends towards wall 102 where it has a projecting contact 71, obtained for example by stamping, which rests on a contact surface 107 made in wall 102 (FIG. 43).

The arm 70 also has, as an extension of the end 702, a base 703 with a hole 704. A screw 705 which passes through hole 704 is screwed into a tapped hole 106 (FIG. 34) made in a reception surface 108 provided in wall 102 (FIGS. 34, 43).

The arm 70 is attached to the wall 102 while exerting an elastic flexion to it between its base 703, which is screwed to the reception surface 108, and the projecting contact 71, which rests on the contact surface 107. This flexion exerts sufficient pressure on contact 71 to ensure that the electrical contact between the arm 70 and the surface 107 does not change over time.

The electrical contact point of arm 70 with wall 102, in this case contact surface 107, is preferably close to the surface 42 which receives the RF signal, so that the parasitic antenna is indirectly fed by the radio frequency signal applied to the closed-slot antenna. In particular, this point is preferably close to the end of the surface 42. It can be seen in FIG. 42 that the projecting contact 71 is here close to the lateral surface 44 of the port.

With reference to FIG. 34 or FIG. 43, the open-slot parasitic antenna also has a part 80 with guiding walls for arm 70 to ensure parallelism with the wall 102. Guide part 80 is also shown in FIG. 44. The free end 701 of the arm 70 is shown in two positions: a relaxed position P1(701) before mounting in the chassis, and a position P2(701) subjected to the elastic flexion mentioned above, where the projecting contact 71 resting on the surface 107 forces the arm to a horizontal position.

Figure 45:
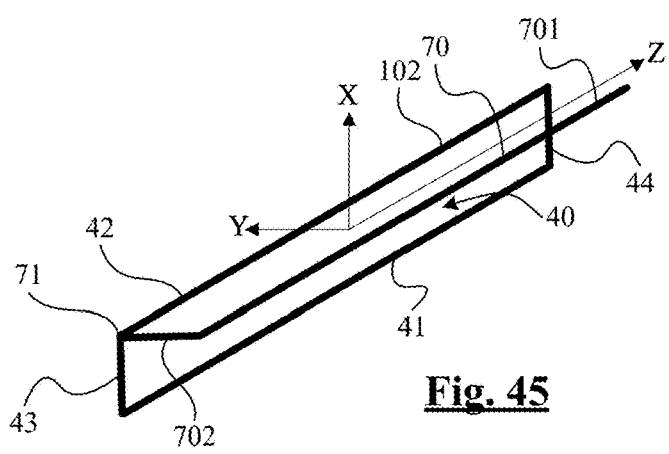
FIG. 45 is an equivalent diagram of an antenna present in the hardware wallet of FIG. 34, FIGS. 46, 47 show a property of the antenna of FIG. 45 in two different uses.

FIG. 45 is a schematic diagram that shows the antenna resulting from the combination of the closed-slot antenna and the open-slot parasitic antenna. The closed-slot antenna comprises surfaces 41 and 42 of port 40, connected by walls 43, 44. The open-slot parasitic antenna comprises arm 70 connected to wall 102 by the projecting contact 71 provided on the captive end 702. The closed-slot antenna has a Y radiation axis that is approximately perpendicular to the chassis sidewall 102, while the open-slot parasitic antenna has an X radiation axis that is approximately perpendicular to the Y-axis, thus parallel to the sidewall 102 and perpendicular to the plane of the chassis 10.

Example of Tuning and Optimizing the Resulting Antenna

The closed-slot antenna and the open-slot parasitic antenna together form a resulting antenna whose design and tuning parameters may be determined by computer simulation. To this end, first the frequency band in which the antenna is to be used is determined. For example, this may be the Bluetooth band or the 2.45 GHz Wi-Fi band, with channel widths that may vary depending on the technology chosen.

In an embodiment offering results that will be described below, the simulation aims to optimize the antenna in the context of Bluetooth communication, i.e. in a targeted frequency band TFB between a frequency Fmin of 2.4 GHz and a frequency Fmax of 2.483 GHz, to obtain at least one of the following results:

(1) the resulting antenna gain in the target frequency band is greater than −5 dB when the chassis 10 of the device HW3 is in the open air, and remains greater than −5 dB when the rear side of the chassis is facing an electrically conductive surface, in particular the plate 105 of the chassis of a similar device HW3-1, HW3-2.

(2) when the chassis 10 is in the open air, the open-slot parasitic antenna has a tuning frequency within the targeted frequency band, and (3) when the rear side of chassis 10 faces a metal surface, and in particular the front plate 105 of the chassis of a similar device, the closed-slot antenna has a tuning frequency within the target frequency band.

In other words, depending on the operating conditions, the radiation from the closed-slot antenna will be predominant over that from the open-slot parasitic antenna or vice-versa.

Among the large number of parameters used to tune the antenna to achieve the desired results, the most important parameters include:

the length Ls of the longitudinal port 40, i.e. the length of the closed-slot antenna, the height Hs of the longitudinal port 40, i.e. the aperture of the closed-slot antenna, the length Lb of the arm 70, which is the length of the open-slot parasitic antenna, the distance Db previously described between arm 70 and port 40, i.e. the aperture of the parasitic open-slot antenna.

As a starting point for the simulation, the theoretical length of the longitudinal port 40 is chosen to be equal to a quarter of the wavelength of a frequency of 2.45 GHz, i.e. 30.6 mm. Tests and simulations set up for achieving the above-mentioned objectives lead to a substantially different value within a few millimeters, due to the presence of the open-slot parasitic antenna. Thus, at the end of the simulations and tests, the following values were obtained, as an example:

length Ls of the longitudinal port 40: 30 mm;

height Hs of the longitudinal port 40: 2.1 mm;

length Lb of arm 70: 22 mm;

distance Db: 1.6 mm.

It will become clear to the skilled person that these values may vary according to other parameters of the antenna, for example the electronic components of the injector 50 (here the capacitors C1 to C3), the shape of the chassis and the location of the port on one of its walls, the quantity of metal constituting the chassis, etc.

Figure 46:
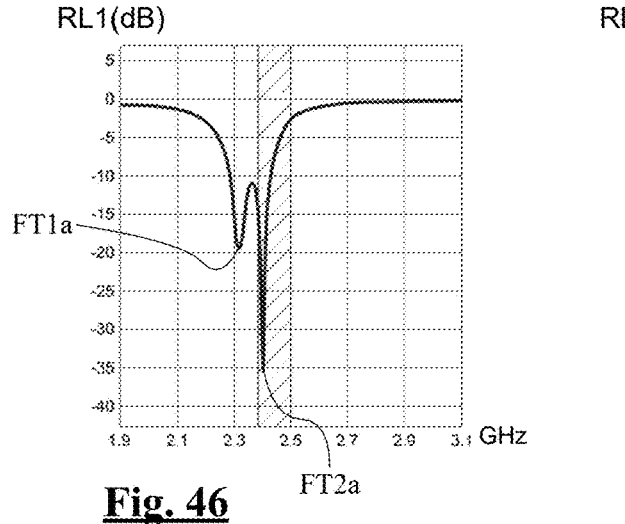
Figure 47:
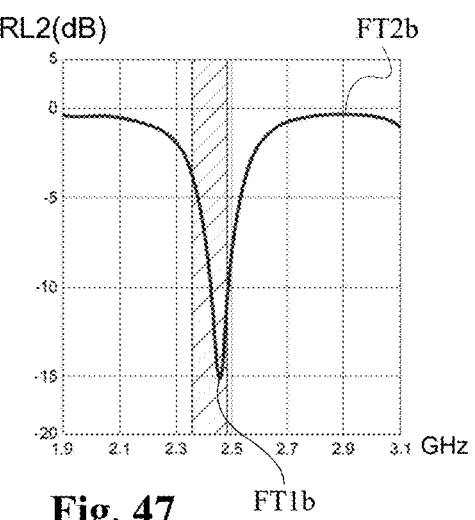
Figure 48:
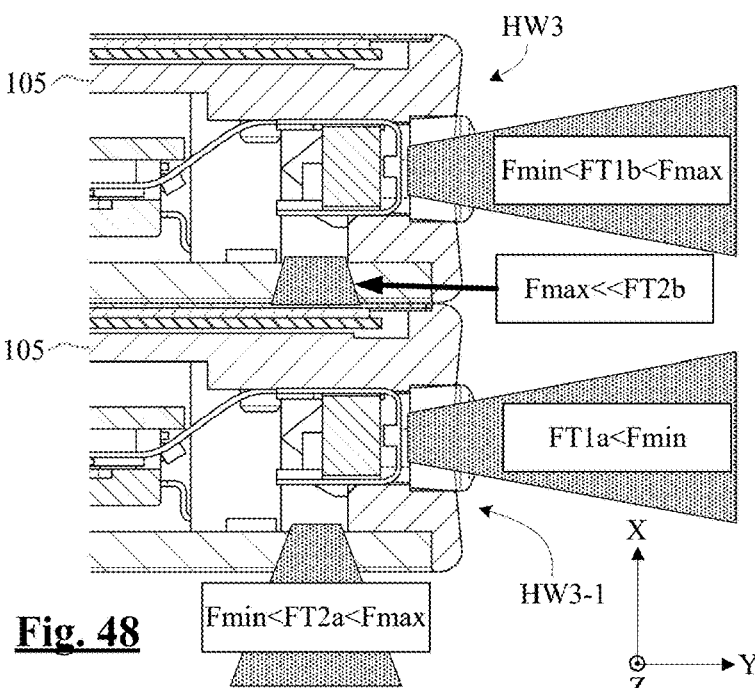
FIG. 48 shows a stack of two hardware wallets.

FIGS. 46 and 47 show curves of the resulting antenna reflection losses or return losses, obtained with the dimensions provided above. FIG. 46 shows the reflection loss curve RL1 when the device HW3 is in the open air. FIG. 47 shows the reflection loss curve RL2 when the device HW3 is stacked on top of a similar device HW3-1, as shown in FIG. 48. Each curve shows two low values of reflection losses, at frequencies that correspond respectively to the tuning frequency FT1 of the closed-slot antenna and the tuning frequency FT2 of the open-slot parasitic antenna. In particular:

FT1$a$ (FIG. 46) is the tuning frequency of the closed-slot antenna when the device is in the open air or when the device is under another similar device (e.g. the device HW3-1 in FIG. 48). These two cases are considered similar because the conductive plate 105 forms a screen that makes the antenna insensitive to what is above it;

FT1$b$ (FIG. 47) is the tuning frequency of the closed-slot antenna when the device is placed on a metal surface or placed on another similar device (e.g. the device HW3 in FIG. 48);

FT2$a$ (FIG. 46) is the tuning frequency of the open-slot parasitic antenna when the device is in the open air or when the device is under another similar device (e.g. the device HW3-1 in FIG. 48). In both cases, the conductive plate 105 forms a screen that blocks the radiation that the parasitic antenna emits upwards along the X-axis, and the presence of metal masses above the device does not change its properties;

FT2$b$ (FIG. 47) is the tuning frequency of the open-slot parasitic antenna when the device is placed on a metal surface or placed on another similar device (e.g. the device HW3 in FIG. 48). In this case, the conductive plate 105 blocks the radiation emitted downwards by the parasitic antenna, along the X-axis.

The following results are obtained, with the tuning frequencies of the closed-slot antenna and the open-slot parasitic antenna being selected for the lowest reflection losses:

FIG. 46 (open air):

FT1$a$=2.32 GHz i.e. FT1$a$<Fmin

FT2$a$=2.42 GHz i.e. Fmin<FT2$a$<Fmax

FIG. 47 (placed on a metal surface or other device):

FT1$b$=2,475 GHz, i.e. Fmin<FT1$b$<Fmax

FT2$b$=3.15 GHz i.e. Fmax<<FT2$b$

With (for the record):

Fmin=2.4 GHz

Fmax=2.483 GHz

In the case of FIG. 46, the tuning frequency FT1$a$ of the closed-slot antenna is "out-of-band" while the tuning frequency FT2$a$ of the open-slot parasitic antenna is in the target frequency band. The radiation from the parasitic open-slot antenna is predominant over that from the closed-slot antenna.

In the case of FIG. 47, the tuning FT1$b$ frequency of the closed-slot antenna is in the target frequency band while the tuning frequency FT2$b$ of the open-slot parasitic antenna is out of band. In fact, it can be seen in FIG. 48 that the parasitic open-slot antenna sees two electromagnetic screens above and below it, along its X radiation axis. The screen above is formed by wall 105 of the chassis in which it is located, and the screen below is formed by wall 105 of the device HW3-1. The radiation from the closed-slot antenna is therefore predominant in this case over that from the parasitic open-slot antenna.

Finally, FIGS. 49A and 49B show the gain CG1, CG2 of the resulting antenna when the device HW3 is in the open, and FIGS. 50A, 50B show the gain CG3, CG4 of the resulting antenna when the device HW3 is placed on a metal surface or a similar device HW3-1. In particular, FIGS. 49A, 50A show the gain CG1, CG3 of the resulting antenna in the Y-Z plane, which is the chassis plane or a horizontal plane when the chassis is laid flat. FIGS. 49B, 50B show the gain CG2, CG4 of the resulting antenna in the vertical plane X-YZ, which is a plane perpendicular to the chassis or a vertical plane when the chassis is laid flat. In the first case, a peak gain of −1.5 dB is obtained at a horizontal angle of 225 degrees and a vertical angle of 105 degrees. In the second case, a peak gain of −3.4 dB is obtained at a horizontal angle of 90 degrees and a vertical angle of 120 degrees.

Thus:

(1) The resulting antenna gain in the target frequency band is greater than −5 dB when the device chassis is in the open air and remains greater than −5 dB when the rear side of the chassis of device HW3 faces an electrically conductive surface, including plate 105 of the chassis of a similar device HW3-1, HW3-2, (2) When the chassis 10 is in the open air, the open-slot parasitic antenna has a tuning frequency within the target frequency band while the closed-slot antenna has a tuning frequency outside the target frequency band, and (3) When the rear side of the chassis faces a metal surface, and in particular the front plate 105 of the chassis of a similar device, the closed-slot antenna has a tuning frequency located in the target frequency band, while the open-slot parasitic antenna has a tuning frequency located outside the target frequency band.

In other words, when the resulting antenna is between two conductive plates, it radiates mainly from the side of the chassis, whereas when the chassis is in the open air, the resulting antenna radiates mainly from the underside of the chassis, which has a plastic cover.

It will become clear to the skilled person that the above-described improvement is subject to variations and is not limited to the application context in which it was designed. In general, the combination of a closed-slot antenna and an open-slot parasitic antenna described above is not related to the chassis structure 10 described above and its application is not limited to a hardware wallet. Such a combination may be used in a variety of applications and portable electronic devices, including but not limited to conditions of use where the metallic environment of the antenna is widely variable.

It will also become clear to the skilled person that the second, third, fourth and fifth improvements, although described in the above in connection with a hardware wallet for the storage of private keys, are independent of each other and may be the subject of separate implementations and various applications other than an application to a hardware wallet.

The invention claimed is:

1. An electronic device comprising:
a chassis of an electrically conductive material, comprising a front side, a rear side and a side wall,
a closed-slot antenna for transmitting or receiving data in a specified frequency band, made in the side wall of the chassis and having a radiation axis substantially perpendicular to the side wall, and
a wireless communication circuit configured to provide a radio frequency signal to the closed-slot antenna,
wherein the closed-slot antenna comprises:
a longitudinal port in and through the side wall of the chassis,
a radio frequency signal injector for applying a ground voltage to a first surface of the longitudinal port and applying the radio frequency signal to a second surface of the longitudinal port, the signal injector comprising:
first and second flat electrodes substantially parallel to each other, the first electrode resting on the first surface of the longitudinal port and the second electrode resting on the second surface of the longitudinal port, and
a compression element of a flexible and elastic material, arranged between the first and second electrodes and exerting on the first and second electrodes a spreading force which presses the first electrode against the first surface of the longitudinal port and presses the second electrode against the second surface of the longitudinal port.

2. The device according to claim 1, wherein the first and second flat electrodes have a contact surface with the first and second surfaces of the longitudinal port which is a function of their length, and each having a length which is at least equal to one quarter of a length of said surfaces.

3. The device according to of claim 1, wherein the radio frequency signal injector comprises electrical conductors and electronic components connecting the first and second electrodes.

4. The device according to claim 1, wherein a length of the longitudinal port is close to one-quarter of a wavelength of a radio frequency signal of frequency 2.4 GHz, or approximately 30.6 mm, within a few millimeters or tenths of a millimeter to account for a presence of an open-slot parasitic antenna.

5. The device according to claim 1, further comprising an open-slot parasitic antenna having a radiation axis substantially perpendicular to the radiation axis of the closed-slot antenna, the open-slot parasitic antenna comprising an electrically conductive arm arranged parallel to and in a vicinity of the longitudinal port, the electrically conductive arm having a free end and an end electrically connected to the side wall of the chassis.

6. The device according to claim 5, wherein the connected end of the arm is electrically connected to the side wall of the chassis in a vicinity of one end of the second surface of the longitudinal port receiving the radio frequency signal.

7. The device according to claim 5, wherein a length and a height of the longitudinal port, a length of the electrically conductive arm and an orthogonal distance between the electrically conductive arm and the side wall of the chassis are configuration parameters of the closed-slot antenna and the open-slot parasitic antenna, and wherein the closed-slot antenna and the open-slot parasitic antenna form a resulting antenna whose gain in the specified frequency band is greater than −5 dB when the chassis of the device is in open air and remains greater than −5 dB when the rear side of the chassis faces an electrically conductive surface.

8. The device according to claim 5, wherein the closed-slot antenna and the open-slot parasitic antenna are configured so that when the rear side of the chassis faces an electrically conductive surface, radiation from the closed-slot antenna is predominant over radiation from the open-slot parasitic antenna.

9. The device according to claim 5, wherein the electrically conductive arm comprises, as an extension of the end electrically connected to the side wall of the chassis, a base attached to the side wall of the chassis, and a projecting contact resting on a contact surface provided in the side wall of the chassis.

10. The device according to claim 9, wherein the electrically conductive arm is mounted under elastic flexion between its base attached to the side wall of the chassis and the projecting contact resting on the contact surface provided in the side wall of the chassis, the elastic flexion exerting pressure on the projecting contact resting on the contact surface.

11. The device according to claim 5, wherein the electrically conductive arm is arranged in a guide member of plastic material ensuring parallelism of the arm with respect to the side wall of the chassis.

12. The device according to claim 5, wherein the chassis has on the front side an electrically conductive plate forming a first screen to radiation emitted by the open-slot parasitic antenna, and wherein the closed-slot antenna and the open-slot parasitic antenna are configured so that:
when the chassis is in open air, the open-slot parasitic antenna has a tuning frequency within the specified frequency band while the closed-slot antenna has a tuning frequency outside the specified frequency band, and
when the rear side of the chassis faces the front side of a similar device or an electrically conductive surface forming a second screen to the radiation emitted by the open-slot parasitic antenna, the closed-slot antenna has a tuning frequency within the specified frequency band while the open-slot parasitic antenna has a tuning frequency outside the specified frequency band.

13. The device according to claim 1, forming a hardware wallet for cold storage of cryptographic keys from a blockchain and comprising a microcontroller and a secure element.

14. The device according to claim 1, wherein the chassis is made of an electrically conductive non-magnetic material and has magnets for magnetically stacking the device with a similar device.

15. The device according to claim 1, wherein the specified frequency band is the Bluetooth band or a Wi-Fi band.

* * * * *